US012597397B2

(12) United States Patent
Monomoshi

(10) Patent No.: US 12,597,397 B2
(45) Date of Patent: Apr. 7, 2026

(54) IMAGE DISPLAY DEVICE AND IMAGE DISPLAY METHOD

(71) Applicant: Nichia Corporation, Anan (JP)

(72) Inventor: Masahiko Monomoshi, Itano-gun (JP)

(73) Assignee: Nichia Corporation, Anan (JP)

( * ) Notice: Subject to any disclaimer, the term of this patent is extended or adjusted under 35 U.S.C. 154(b) by 2 days.

(21) Appl. No.: 18/537,145

(22) Filed: Dec. 12, 2023

(65) Prior Publication Data

US 2024/0203372 A1 Jun. 20, 2024

(30) Foreign Application Priority Data

Dec. 16, 2022 (JP) ................................ 2022-201323

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2300/0452* (2013.01); *G09G 2320/0233* (2013.01); *G09G 2320/0626* (2013.01); *G09G 2340/00* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 2008/0111784 | A1* | 5/2008 | Tanaka | G09G 3/342 345/102 |
| 2008/0278432 | A1* | 11/2008 | Ohshima | G09G 3/3426 345/102 |
| 2012/0169792 | A1* | 7/2012 | Yamashita | G02F 1/1336 345/690 |
| 2014/0327704 | A1* | 11/2014 | Wei | G09G 3/3406 345/102 |
| 2015/0035870 | A1 | 2/2015 | Ooya | |
| 2018/0157121 | A1 | 6/2018 | Matsuura et al. | |
| 2021/0390916 | A1* | 12/2021 | Shi | G09G 3/342 |
| 2022/0277700 | A1 | 9/2022 | Monomoshi | |
| 2023/0139266 | A1* | 5/2023 | Ooga | G09G 3/3426 345/694 |

FOREIGN PATENT DOCUMENTS

| | | | |
|---|---|---|---|
| JP | 2007-322942 | A | 12/2007 |
| JP | 2009-192963 | A | 8/2009 |
| JP | 2012-002862 | A | 1/2012 |

(Continued)

*Primary Examiner* — Christopher R Lamb
(74) *Attorney, Agent, or Firm* — Kim & Stewart LLP

(57) ABSTRACT

An image display device includes a planar backlight including a plurality of light-emitting regions, a display panel including a plurality of pixels, and a controller. The controller generates luminance setting data based on image data and data of positional correction coefficients. The controller generates luminance estimation data based on the luminance setting data, luminance profile data, and the data of the positional correction coefficients. The controller generates gradation setting data based on the image data and the luminance estimation data. The controller controls the planar backlight to operate based on the luminance setting data and the display panel to operate based on the gradation setting data to display an image corresponding to the image data.

18 Claims, 16 Drawing Sheets

(56) References Cited

FOREIGN PATENT DOCUMENTS

| | | | |
|---|---|---|---|
| JP | 2015-031874 | A | 2/2015 |
| JP | 2018-054683 | A | 4/2018 |
| JP | 2018-092082 | A | 6/2018 |
| JP | 2019-179187 | A | 10/2019 |
| JP | 2022-131262 | A | 9/2022 |

* cited by examiner

POSITIONAL CORRECTION COEFFICIENTS k

| | | | | | | | | | |
|---|---|---|---|---|---|---|---|---|---|
| k_1 | k_2 | k_3 | k_4 | k_5 | k_5 | k_5 | k_5 | k_5 | k_5 |
| k_1 | k_2 | k_3 | k_4 | k_5 | k_5 | k_5 | k_5 | k_5 | k_5 |
| k_1 | k_2 | k_3 | k_4 | k_5 | k_5 | k_5 | k_5 | k_5 | k_5 |
| k_1 | k_2 | k_3 | k_4 | k_5 | k_5 | k_5 | k_5 | k_5 | k_5 |
| k_1 | k_2 | k_3 | k_4 | k_5 | k_5 | k_5 | k_5 | k_5 | k_5 |
| k_1 | k_2 | k_3 | k_4 | k_5 | k_5 | k_5 | k_5 | k_5 | k_5 |
| k_1 | k_2 | k_3 | k_c4 | k_4 | k_4 | k_4 | k_4 | k_4 | k_4 |
| k_1 | k_2 | k_c3 | k_3 | k_3 | k_3 | k_3 | k_3 | k_3 | k_3 |
| k_1 | k_c2 | k_2 | k_2 | k_2 | k_2 | k_2 | k_2 | k_2 | k_2 |
| k_c1 | k_1 | k_1 | k_1 | k_1 | k_1 | k_1 | k_1 | k_1 | k_1 |

IMAGE DISPLAY DEVICE AND IMAGE DISPLAY METHOD

CROSS-REFERENCE TO RELATED APPLICATIONS

This application is based upon and claims the benefit of priority from the prior Japanese Patent Application No. 2022-201323, filed on Dec. 16, 2022; the entire contents of which are incorporated herein by reference.

FIELD

The present disclosure relates to an image display device and an image display method.

BACKGROUND

An image display device known in the art includes a backlight that includes multiple light-emitting regions arranged in a matrix configuration and in which light sources are provided in the light-emitting regions, and a liquid crystal panel that is located above the backlight and includes multiple pixels. Technology for such an image display device has been proposed in which the luminances of the light-emitting regions are individually set according to an image to be displayed in the image display device, and gradations of the pixels of the liquid crystal panel are set according to the luminances of the light-emitting regions. The contrast of the image to be displayed in the image display device can be improved thereby. Such technology is called "local dimming". In the local dimming, when an original image to be displayed has uniform brightness, it is desirable for the luminance of the backlight to be uniform in the plane.

SUMMARY

Embodiments are directed to an image display device and an image display method in which the brightness of the displayed image can be more uniform.

According to one aspect of the present invention, an image display device includes a planar backlight including a plurality of light-emitting regions, a display panel coupled to the planar backlight and including a plurality of pixels, and a controller. The controller is configured to, with respect to input image data, generate luminance setting data, luminance estimation data, gradation setting data, and control the planar backlight to operate based on the luminance setting data and the display panel to operate based on the gradation setting data to display an image corresponding to the input image data. The luminance setting data sets a luminance value for each of the light-emitting regions of the planar backlight and is generated based on the input image data, and data of positional correction coefficients that are set with respect to the plurality of light-emitting regions, respectively, for compensating luminance non-uniformity. The luminance estimation data indicates an estimated luminance value of the planar backlight operated in accordance with the luminance setting data with respect to each of the plurality of light-emitting regions. The luminance estimation data is generated based on the luminance setting data, luminance profile data indicating a luminance distribution of light emitted by a single light-emitting region of the planar backlight onto the single light-emitting region and adjacent light-emitting regions thereof, and the data of positional correction coefficients. The gradation setting data sets a gradation value for each of the pixels of the display panel, and generated based on the input image data and the luminance estimation data.

According to one aspect of the present invention, an image display method uses a planar backlight including a plurality of light-emitting regions and a display panel coupled to the planar backlight and including a plurality of pixels. The method includes, with respect to input image data, generating luminance setting data, generating luminance estimation data, generating gradation setting data, and controlling the planar backlight to operate based on the luminance setting data and the display panel to operate based on the gradation setting data to display an image corresponding to the input image data. The luminance setting data sets a luminance value for each of the light-emitting regions of the planar backlight and is generated based on the input image data, and data of positional correction coefficients that are set with respect to the plurality of light-emitting regions, respectively, for compensating luminance non-uniformity. The luminance estimation data indicates an estimated luminance value of the planar backlight operated in accordance with the luminance setting data with respect to each of the plurality of light-emitting regions. The luminance estimation data is generated based on the luminance setting data, luminance profile data indicating a luminance distribution of light emitted by a single light-emitting region of the planar backlight onto the single light-emitting region and adjacent light-emitting regions thereof, and the data of positional correction coefficients. The gradation setting data sets a gradation value for each of the pixels of the display panel, and generated based on the input image data and the luminance estimation data.

According to embodiments, an image display device and an image display method can be realized in which the brightness of the displayed image can be more uniform.

DETAILED DESCRIPTION

Figure 1:
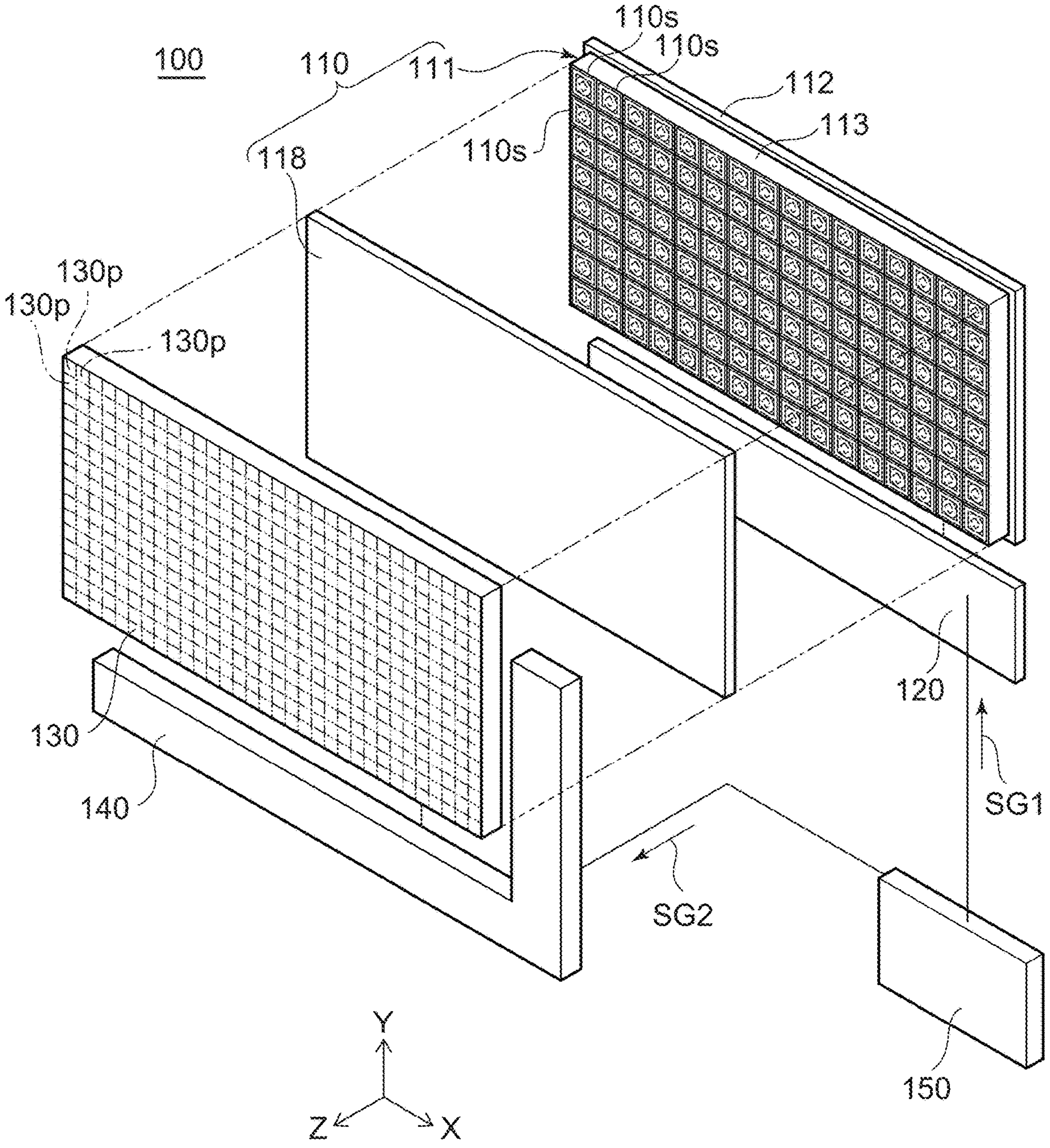
FIG. 1 illustrates an exploded perspective view of an image display device according to an embodiment.

Exemplary embodiments will now be described with reference to the drawings. The drawings are schematic or conceptual; and the relationships between the thickness and width of portions, the proportional coefficients of sizes among portions, etc., are not necessarily the same as the actual values thereof. The dimensions and proportions may be illustrated differently among drawings, even when the same portion is illustrated. In the specification of the application and the drawings, components that are the same as or similar to those described in regard to a drawing above are marked with like reference numerals, and a detailed description is omitted as appropriate.

In the specification and drawings, the arrangements and configurations of the elements and/or portions of the image display device are described using an XYZ orthogonal coordinate system. The directions in which an X-axis extends are taken as an "X-direction"; the directions in which a Y-axis extends are taken as a "Y-direction"; and the directions in which a Z-axis extends are taken as a "Z-direction". Among the directions in which the X-axis extends, the direction of the arrow is taken as the "+X direction", and the opposite direction is taken as the "−X direction". Similarly, among the directions in which the Y-axis extends, the direction of the arrow is taken as the "+Y direction", and the opposite direction is taken as the "−Y direction". Although the Z-direction may be referred to as upward direction, up, or above and the opposite direction may be referred to as downward direction down, or below, these expressions are for convenience and are independent of the direction of gravity.

Image Display Device

FIG. 1 illustrates an exploded perspective view of an image display device according to the embodiment.

The image display device 100 according to the embodiment is, for example, a liquid crystal module (LCM) used in the display of a device such as a television, a personal computer, a game machine, etc. The image display device 100 includes a backlight 110, a driver 120 for the backlight, a display panel 130, a driver 140 for the display panel, and a controller 150. The image display device 100 is drivable in accordance with local dimming.

Components of the image display device 100 will now be described. In FIG. 1, the electrical connections between the components are illustrated by connecting the components to each other with solid lines. The Z-direction is the direction from the backlight 110 toward the display panel 130, i.e., the main displaying direction of the image. The X-direction corresponds to the lateral direction of the image; and the Y-direction corresponds to the vertical direction of the image.

Backlight 110

Figure 2:
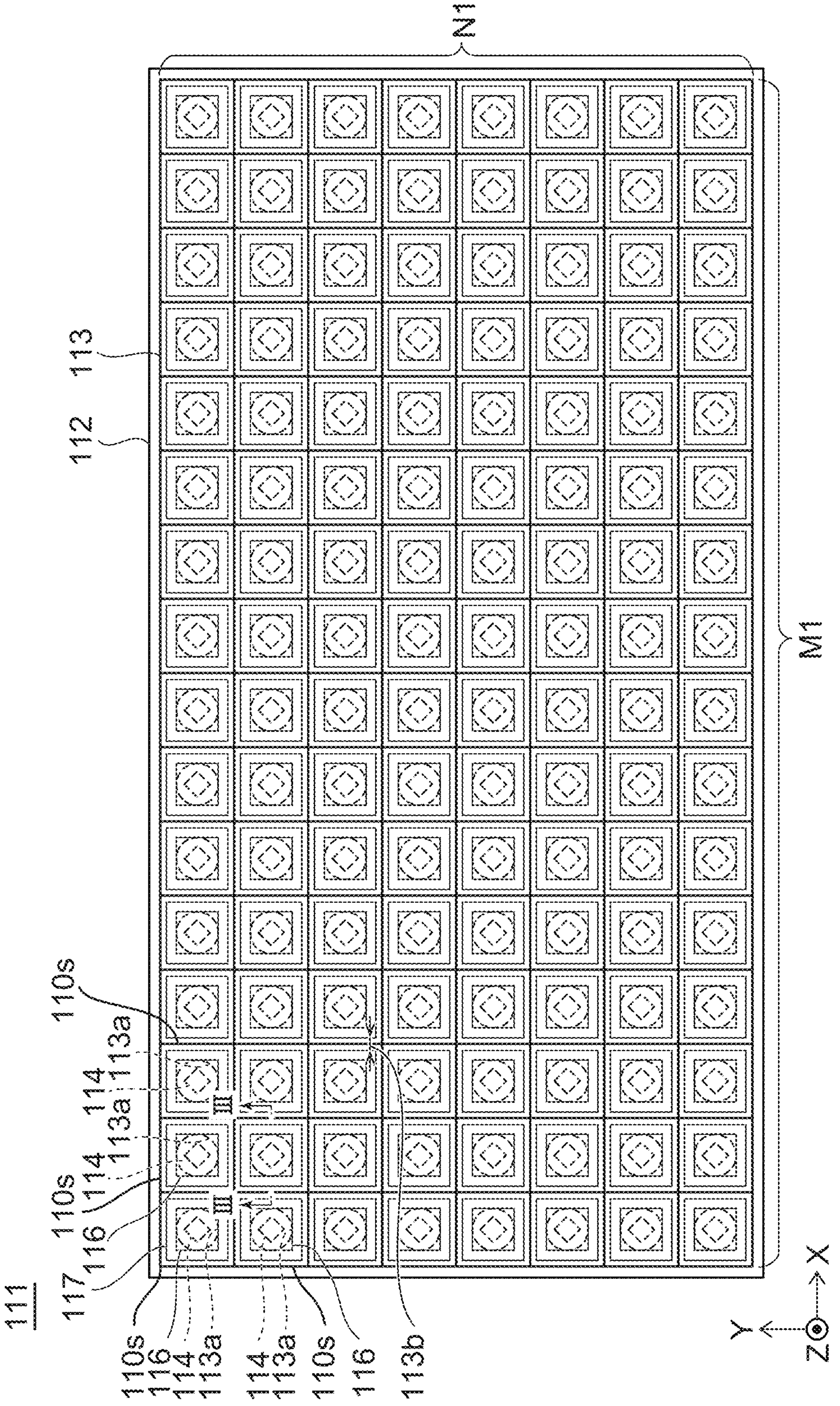
FIG. 2 illustrates a top view of a planar light source of a backlight of the image display device according to the embodiment.

FIG. 2 illustrates a top view of the planar light source of the backlight of the image display device according to the embodiment.

Figure 3:
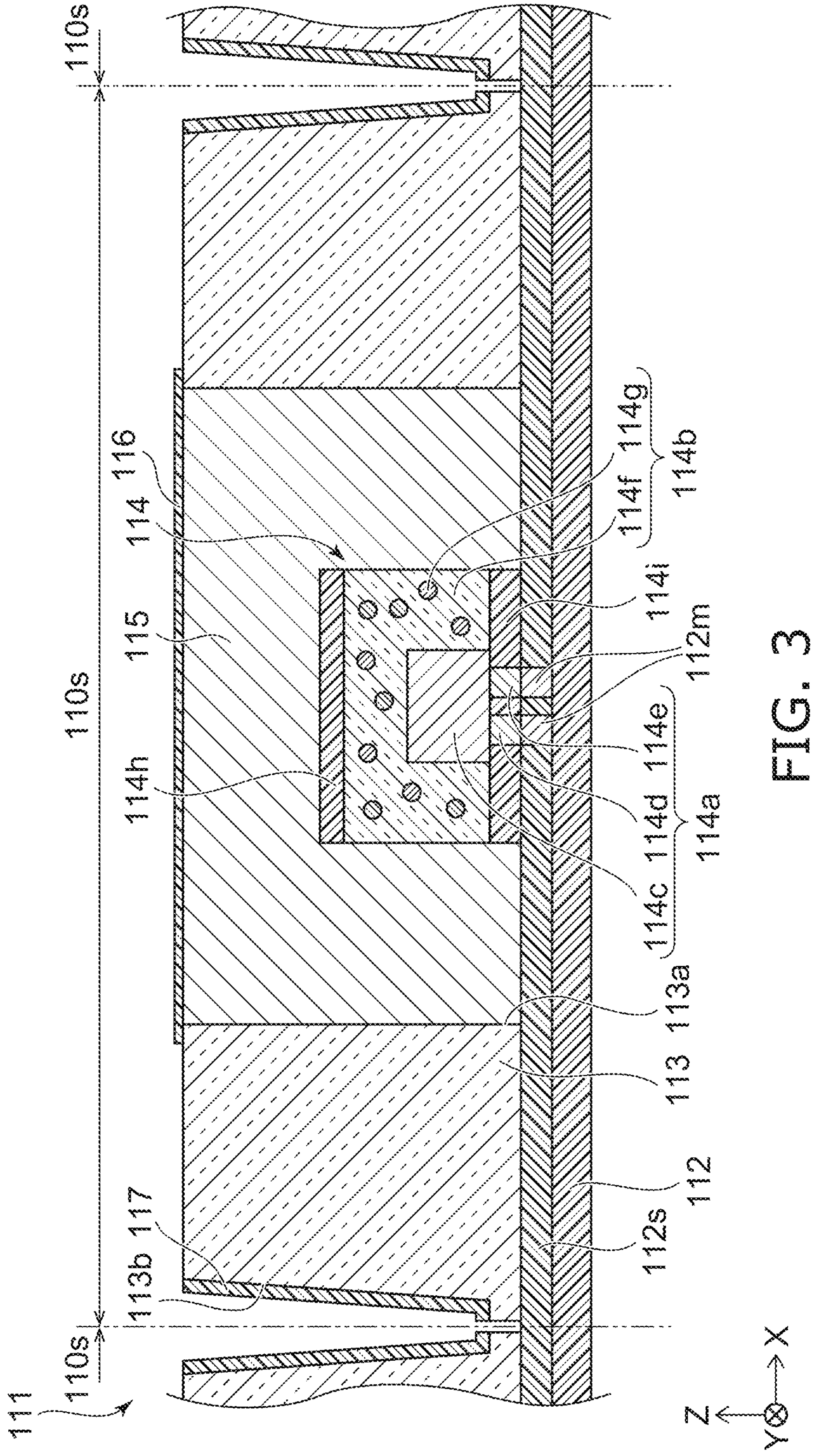
FIG. 3 illustrates a cross-sectional view of a light source along line III-III of FIG. 2.

FIG. 3 illustrates a cross-sectional view of a light source of the backlight along line III-III of FIG. 2.

As shown in FIG. 1, the backlight 110 includes a planar light source 111, and an optical member 118 provided on the planar light source 111. Although not particularly limited, the optical member 118 is, for example, a sheet-like member having a light-modulating function such as a light-diffusing function, a function of reflecting and/or absorbing light of a specific wavelength and transmitting light of another wavelength, etc. According to the embodiment, the number of the optical members 118 included in the backlight 110 is one. Alternatively, the number of optical members included in the backlight may be two or more.

As shown in FIGS. 1 to 3, the planar light source 111 includes a substrate 112, a light-reflective sheet 112*s*, a light guide member 113, multiple light sources 114, light-transmitting members 115, first light-modulating members 116, and light-reflecting members 117.

The substrate 112 is a wiring substrate that includes an insulating member, and multiple wiring parts in the insulating member. According to the embodiment, the shape of the substrate 112 in a top view is substantially rectangular as shown in FIG. 2. However, the shape of the substrate is not limited to such a shape.

As shown in FIG. 3, the light-reflective sheet 112*s* is provided on the substrate 112. According to the embodiment, the light-reflective sheet 112*s* includes a first adhesive layer, a light-reflecting layer on the first adhesive layer, and a second adhesive layer on the light-reflecting layer. The light-reflective sheet 112*s* is adhered to the substrate 112 by the first adhesive layer.

The light guide member 113 is provided on the light-reflective sheet 112*s*. At least a portion of a lower surface of the light guide member 113 is adhered to the light-reflective sheet 112*s* by the second adhesive layer. According to the embodiment, the light guide member 113 is a sheet-like member. It is preferable for the thickness of the light guide member 113 to be, for example, not less than 200 μm and not more than 800 μm. The light guide member 113 may be formed of a single layer or may be formed of a stacked body of multiple layers, in the thickness direction. According to the embodiment, the shape of the light guide member 113 in a top view is substantially rectangular as shown in FIG. 2. However, the shape of the light guide member is not limited to such a shape.

For example, a thermoplastic resin such as acrylic, polycarbonate, cyclic polyolefin, poly(ethylene terephthalate), polyester, or the like, a thermosetting resin such as an epoxy, silicone or the like, or glass, etc., can be used as a material included in the light guide member 113.

Multiple light source placement portions 113*a* are provided in the light guide member 113. The multiple light source placement portions 113*a* are arranged in a matrix configuration in a top view. According to the embodiment as shown in FIG. 3, each light source placement portion 113*a* is a through-hole that extends through the light guide member 113 in the Z-direction. Alternatively, the light source placement portion may be a bottomed recess provided at the lower surface of the light guide member 113.

The light sources 114 are provided in the light source placement portions 113*a*. That is, as shown in FIG. 2, the multiple light sources 114 also are arranged in a matrix configuration. However, a light guide member does not have to be included in the planar light source. For example, the planar light source may not include the light guide member; and multiple light sources may be simply arranged in a matrix configuration on the substrate 112. When no light guide member is included, the light source placement portion refers to a portion of the substrate at which the light source is located.

Each light source 114 may be a light-emitting element alone or may include a light-emitting device in which, for example, a wavelength conversion member or the like is combined with a light-emitting element. According to the embodiment as shown in FIG. 3, each light source 114 includes a light-emitting element 114*a*, a wavelength conversion member 114*b*, a second light-modulating member 114*h*, and a third light-modulating member 114*i*.

The light-emitting element 114*a* is, for example, an LED (Light-Emitting Diode) and includes a semiconductor stacked body 114*c* and a pair of electrodes 114*d* and 114*e* that electrically connects the semiconductor stacked body 114*c* to the wiring parts of the substrate 112. Two through-holes are provided in the third light-modulating member 114*i*, and the electrodes 114*d* and 114*e* are located in these through-holes. Two through-holes also are provided in portions of the light-reflective sheet 112*s* positioned directly under the electrodes 114*d* and 114*e*. Conductive members 112*m* are provided in these through-holes. The conductive members 112*m* electrically connect the electrodes 114*d* and 114*e* to the wiring parts of the substrate 112.

The wavelength conversion member 114*b* includes a light-transmitting member 114*f* that covers the upper surface and lateral surfaces of the semiconductor stacked body 114*c*, and a wavelength conversion substance 114*g* that is provided in the light-transmitting member 114*f* and converts the wavelength of the light emitted by the semiconductor stacked body 114*c* into a different wavelength. The wavelength conversion substance 114*g* is, for example, a phosphor.

According to the embodiment, the light-emitting element 114*a* emits blue light. On the other hand, the wavelength conversion member 114*b* includes, for example, a phosphor that emits red light (hereinbelow, called a red phosphor) such as a CASN-based phosphor (e.g., $CaAlSiN_3$:Eu), a KSF-based phosphor (e.g., $K_2SiF_6$:Mn), a KSAF-based phosphor (e.g., $K_2(Si_{1-x}Al_x)F_{6-x}$:Mn, wherein x satisfies $0<x<1$), a Group III-V quantum dot (e.g., InP), a quantum dot having a chalcopyrite structure (e.g., (Ag, Cu)(In, Ga)$Se_2$), or the like, a phosphor that emits green light (hereinbelow, called a green phosphor) such as a quantum dot having a perovskite structure (e.g., (Cs, FA, MA)(Pb, Sn)(F, Cl, Br, I)$_3$, wherein FA and MA are respectively formamidinium and methylammonium), a quantum dot having a chalcopyrite structure (e.g., (Ag, Cu)(In, Ga)$S_2$), a R-sialon-based phosphor (e.g., (Si, Al)$_3$(O, N)$_4$:Eu), a LAG-based phosphor (e.g., $Lu_3(Al, Ga)_5O_{12}$:Ce), etc. As a result, the backlight 110 can emit white light that is a mixed light of blue light emitted by the light-emitting element 114*a* and red and green light emitted by the wavelength conversion member 114*b*. The wavelength conversion member 114*b* may be replaced with a light-transmitting member including no phosphor, in such a case, for example, a similar white light can be obtained by providing a phosphor sheet that includes a red phosphor and a green phosphor on the planar light source.

The second light-modulating member 114*h* is provided on the upper surface of the wavelength conversion member 114*b* and can control the amount and/or the emission direction of the light emitted from the upper surface of the wavelength conversion member 114*b*. The third light-modulating member 114*i* is located under the lower surface of the semiconductor stacked body 114*c* and the lower surface of the wavelength conversion member 114*b* so that the lower surfaces of the electrodes 114*d* and 114*e* are not covered by the third light-modulating member 114*i*. The third light-modulating member 114*i* reflects the light directed toward the lower surface of the wavelength conversion member 114*b* to exit from the upper surface and lateral surfaces of the wavelength conversion member 114*b*. The second light-modulating member 114*h* and the third light-modulating member 114*i* can include a light-transmitting resin, a light-diffusing agent included in the light-transmitting resin, etc. The light-transmitting resin is, for example, a silicone resin, an epoxy resin, or an acrylic resin. Examples of the light-diffusing agent include, for example, particles of $TiO_2$, $SiO_2$, $Nb_2O_5$, $BaTiO_3$, $Ta_2O_5$, $Zr_2O_3$, $Y_2O_3$, $Al_2O_3$, ZnO, MgO, $BaSO_4$, glass, etc. The second light-modulating member 114*h* also may include metal such as, for example, aluminum, silver, etc., so that the luminance directly above the light source 114 does not become too high.

The light-transmitting member 115 is provided in the light source placement portion 113*a*. The light-transmitting member 115 covers the light source 114. The first light-modulating member 116 is provided on the light-transmitting member 115. The first light-modulating member 116 can reflect a portion of the light incident from the light-transmitting member 115 and can transmit another portion of the light so that the luminance directly above the light source 114 does not become too high. Such a first light-modulating member 116 can include a member that is the same as or similar to the second light-modulating member 114*h* or the third light-modulating member 114*i*.

Partitioning grooves 113*b* are provided in the light guide member 113 to surround the light source placement portions 113*a* in a top view. The partitioning grooves 113*b* have a lattice shape in the X-direction and the Y-direction. The partitioning grooves 113*b* extend through the light guide member 113 in the Z-direction. Alternatively, the partitioning groove may be a recess provided in the upper surface or lower surface of the light guide member. Further alternatively, the partitioning groove may not be provided in the light guide member.

The light-reflecting member 117 is provided in the partitioning grooves 113*b*. For example, a light-transmitting resin that includes a light-diffusing agent can be used as the light-reflecting member 117. Examples of the light-diffusing agent include, for example, particles of $TiO_2$, $SiO_2$, $Nb_2O_5$, $BaTiO_3$, $Ta_2O_5$, $Zr_2O_3$, ZnO, $Y_2O_3$, $Al_2O_3$, MgO, $BaSO_4$, glass, etc. Examples of the light-transmitting resin include, for example, a silicone resin, an epoxy resin, an acrylic resin, etc. For example, a metal member of aluminum, silver, etc., may be used as the light-reflecting member 117. The light-reflecting member 117 covers a portion of the lateral surfaces of the partitioning grooves 113*b* as a layer. Alternatively, the light-reflecting member may fill the entire interior of the partitioning grooves. Also, no light-reflecting member may be located in the partitioning grooves.

According to the embodiment, the outputs of the multiple light sources 114 are individually controllable by the backlight driver 120. Here, "controllable output" means that switching between a lit state and an unlit state is possible, and the luminance in the lit state is adjustable. For example, the planar light source may have a structure in which the output is controllable for each light source, or may have a structure in which multiple light source groups are arranged in a matrix configuration, and the output is controllable for each light source group.

In the present disclosure, each region of the planar light source 111 when subdivided into a plurality of regions that include light sources or light source groups of which outputs are individually controlled is called "light-emitting region". In other words, the light-emitting region means the minimum region of the backlight of which luminance is controlled in accordance with local dimming. In the example shown in FIG. 3, the regions where the planar light source 111 is divided by the partitioning grooves 113*b* correspond to light-emitting regions 110*s*.

Each light-emitting region 110*s* is rectangular. According to the embodiment, one light source 114 is included in one light-emitting region 110*s*. Then, the luminances of the multiple light-emitting regions 110*s* are individually controlled by the backlight driver 120 individually controlling the outputs of the multiple light sources 114. As described above, when the output is controlled for each of multiple light source groups, one light source group (i.e., multiple light sources) is located in one light-emitting region, and the multiple light sources are simultaneously lit or unlit.

The multiple light-emitting regions 110*s* are arranged in a matrix configuration in a top view. Hereinbelow, in the structure of a matrix configuration such as that of the multiple light-emitting regions 110*s*, the element group of the matrix of the light-emitting region 110*s* or the like arranged in the X-direction is called a "row", and the element group of the matrix of the light-emitting region 110*s* or the like arranged in the Y-direction is called a "column". The multiple light-emitting regions 110*s* are arranged in N1 rows and M1 columns. Here, N1 and M1 are each any integer. FIG. 2 shows an example in which N1 is 8 and M1 is 16, and the planar light source 111 includes 128 light-emitting regions 110*s*. However, N1 and M1 are not limited thereto. For example, N1 may be 25, M1 may be 40, and the planar light source 111 may include 1,000 light-emitting regions 110*s*.

Although the planar light source 111 includes the partitioning grooves 113*b* and the light-reflecting member 117 as shown in FIG. 3, the adjacent light-emitting regions 110*s* are not completely light shielded from each other. Therefore, light can mutually propagate between the adjacent light-emitting regions 110*s*. Accordingly, the light that is emitted by the light source 114 in one light-emitting region 110*s* when the light source is lit may propagate to neighboring light-emitting regions 110*s* at the periphery of the one light-emitting region 110*s*.

As shown in FIG. 1, the backlight driver 120 is connected to the substrate 112 and the controller 150. The backlight driver 120 includes a drive circuit of the multiple light sources 114. The backlight driver 120 adjusts the luminances of the light-emitting regions 110*s* according to backlight control data SG1 received from the controller 150.

Display Panel 130

Figure 4:
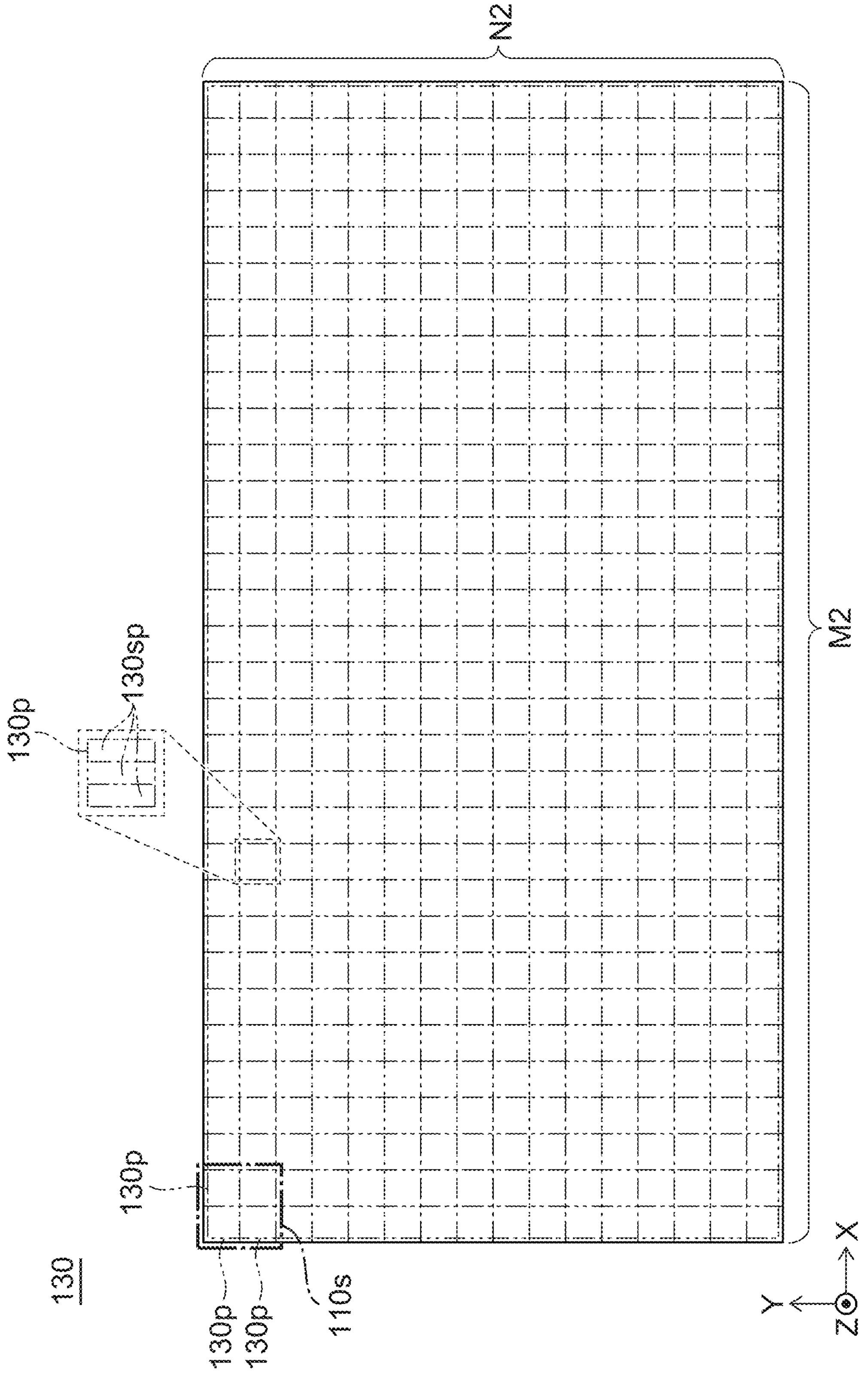
FIG. 4 illustrates a top view of a display panel of the image display device according to the embodiment.

FIG. 4 illustrates a top view of the display panel 130 of the image display device 100 according to the embodiment.

The display panel 130 is provided on the backlight 110. The display panel 130 is a transmission-type display device, e.g., a liquid crystal panel, that operates to display an image by selectively transmitting the light emitted from the backlight 110. However, the display panel 130 is not limited to a liquid crystal panel. According to the embodiment, the display panel 130 is substantially rectangular in a top view. The display panel 130 includes multiple pixels 130*p* arranged in a matrix configuration. In FIG. 4, one region surrounded with a double dot-dash line corresponds to one pixel 130*p*.

The display panel 130 according to the embodiment can be used to display a color image. For that objective, one pixel 130*p* includes three subpixels 130*sp*, e.g., a subpixel configured to transmit blue light, a subpixel configured to transmit green light, and a subpixel configured to transmit red light included in white light emitted from the backlight 110. The light transmittances of the subpixels 130*sp* are individually controllable by the display panel driver 140. The gradations of the subpixels 130*sp* are individually controlled thereby.

The multiple pixels 130*p* are arranged in N2 rows and M2 columns. Here, N2 and M2 each are any integer such that N2>N1 and M2>M1. The multiple pixels 130*p* are provided in each light-emitting regions 110 in a top view. Although FIG. 4 shows an example in which four pixels 130*p* correspond to one light-emitting region 110*s*, the number of the pixels 130*p* that correspond to one light-emitting region 110*s* may be less than four or more than four.

As shown in FIG. 1, the display panel driver 140 is connected to the display panel 130 and the controller 150. The display panel driver 140 includes a drive circuit of the display panel 130. The display panel driver 140 adjusts the gradations of the pixels 130*p* according to display panel control data SG2 received from the controller 150.

Controller 150

Figure 5:
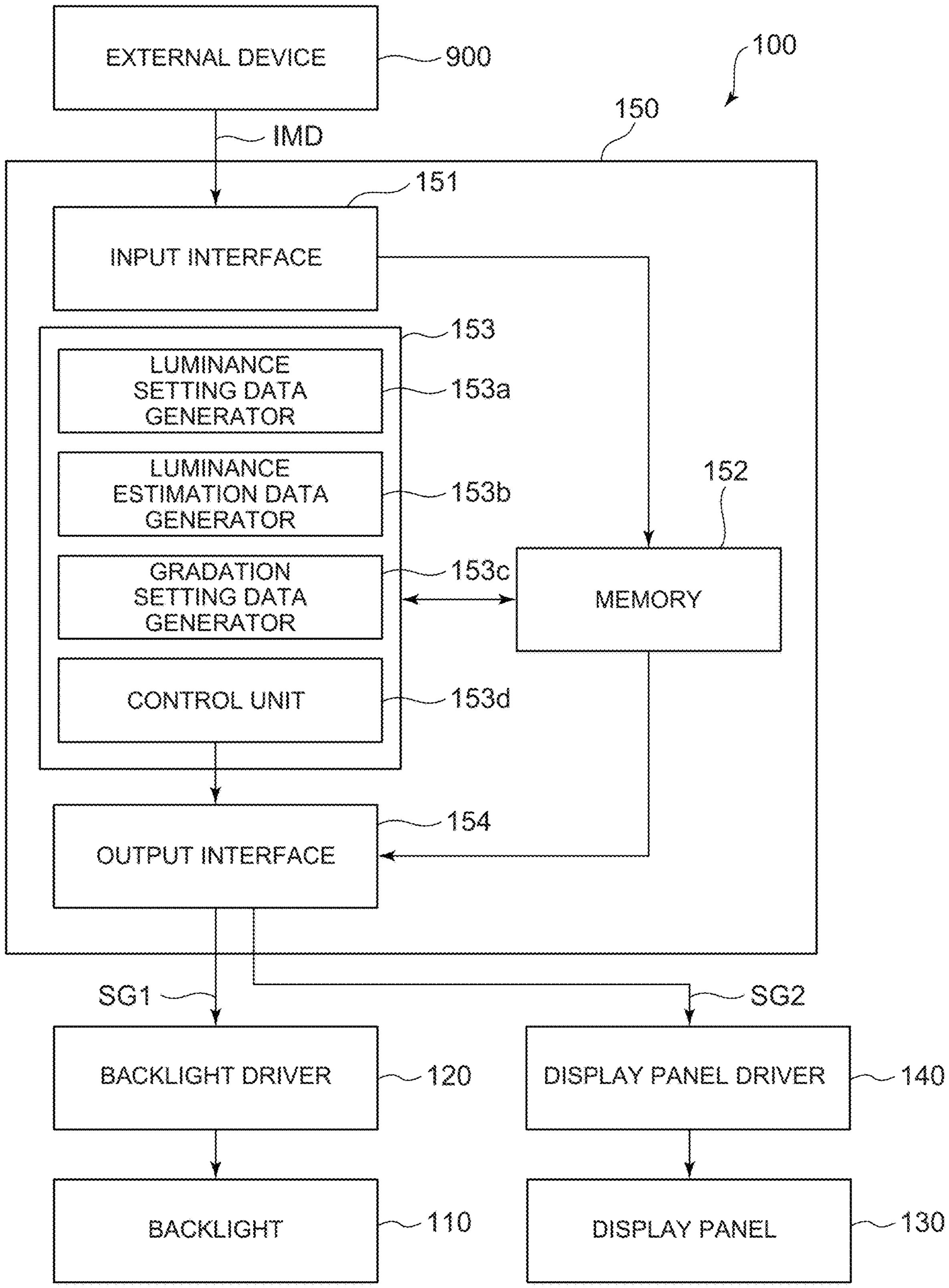
FIG. 5 is a block diagram showing functional components of the image display device according to the embodiment.

FIG. 5 is a block diagram showing functional components of the image display device according to the embodiment.

Figure 6:
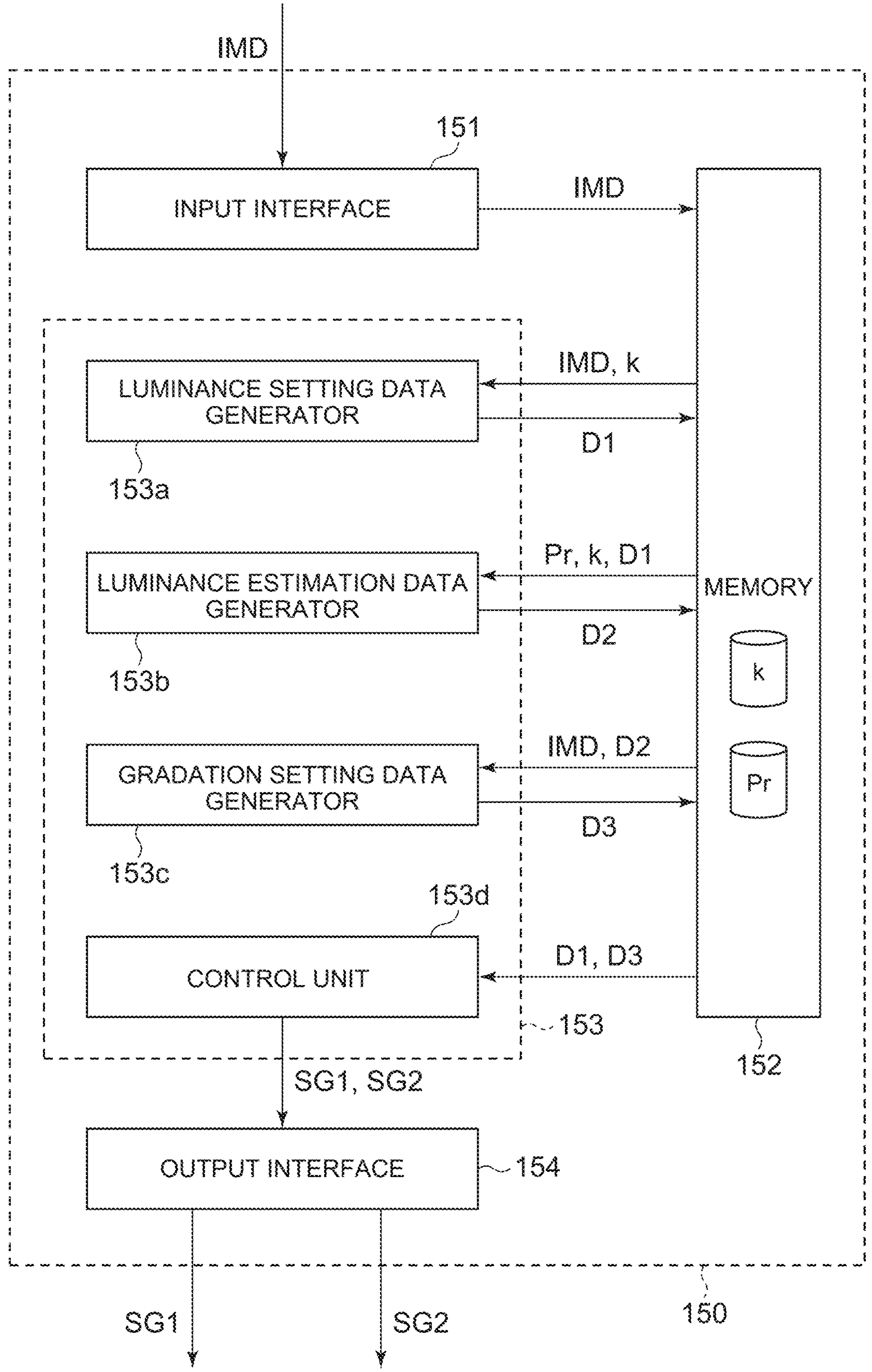
FIG. 6 is a drawing showing a flow of data in a controller of the image display device according to the embodiment.

FIG. 6 is a drawing showing the flow of data in the controller of the image display device according to the embodiment.

Figures 7, 8:
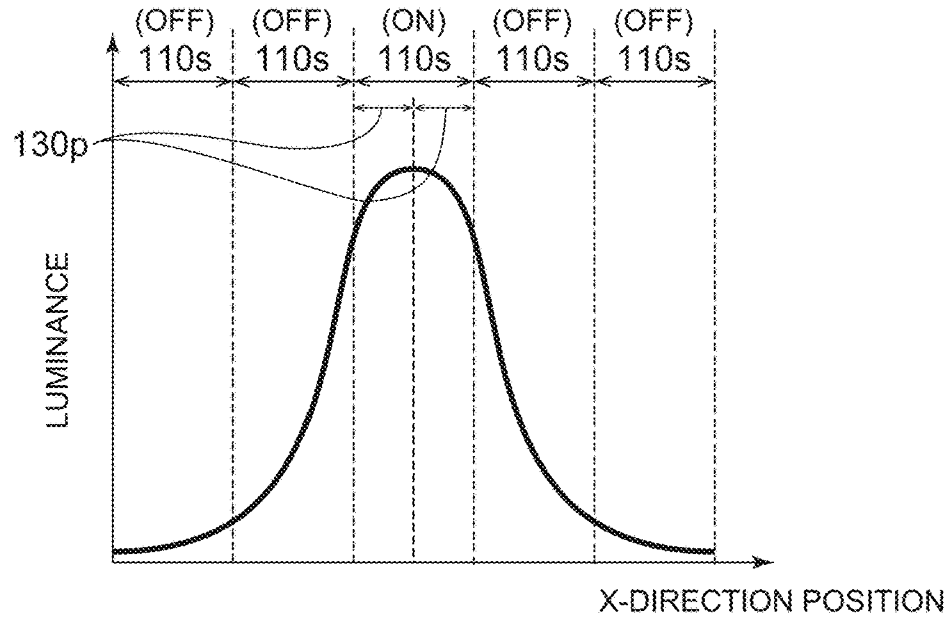
FIG. 7 shows a relationship between positional correction coefficients and positions of light-emitting regions of the backlight.
FIG. 8 is a graph showing a luminance profile of a light emitting region of the backlight.

FIG. 7 shows the relationship between positional correction coefficients and positions of the light-emitting regions.

FIG. 8 is a graph showing a luminance profile of the embodiment, in which the lateral axis is the X-direction position and the vertical axis is the luminance.

Although data and the like representing the same content in the specification are described using the same names and the same reference numerals, the format of the data may be modified as appropriate according to the processing.

According to the embodiment as shown in FIG. 5, the controller 150 includes an input interface 151, memory 152, a processor 153 such as a CPU (Central Processing Unit) or the like, and an output interface 154. These components are connected to each other by a bus.

For example, the input interface 151 is connected to an external device 900 such as a tuner, a personal computer, a game machine, etc. The input interface 151 includes, for example, a connection terminal to the external device 900 such as a HDMI (registered trademark) (High-Definition Multimedia Interface) terminal, etc. The external device 900 inputs image data IMD to the controller 150 via the input interface 151. The image data IMD is digital data of one image IM, which may be referred to as one frame image. Specific examples of the image data IMD are described below.

The memory 152 includes, for example, ROM (Read-Only Memory), RAM (Random-Access Memory), etc. ROM includes, for example, flash memory, and RAM includes, for example, registers. The memory 152 stores various programs, various parameters, and various data for displaying the image in the display panel. In an example, data of positional correction coefficients k, which is described below, is stored in a register, and a luminance profile Pr is stored in flash memory.

By reading the programs and various data stored in the memory 152, the processor 153 processes the image data IMD, determines the setting values of the luminances of the light-emitting regions 110*s* of the backlight 110 and the setting values of the gradations of the pixels 130*p* of the display panel 130, and controls the backlight 110 and the display panel 130 based on these setting values. As a result, the image IM that corresponds to the image data IMD is displayed in the display panel 130. The processor 153 includes a luminance setting data generator 153*a*, a luminance estimation data generator 153*b*, a gradation setting data generator 153*c*, and a control unit 153*d*.

As shown in FIG. 6, based on the image data IMD and the data of positional correction coefficients k that are input, the luminance setting data generator 153*a* generates luminance setting data D1 of the setting values of the luminances of the light-emitting regions 110*s*. The data of positional correction coefficients data k is a group of coefficients set for light-emitting region 110*s*, respectively, and is associated with the positions of the light-emitting regions 110*s* in the planar light source 111, respectively. For example, the data of positional correction coefficients k is set in the design stage of the image display device 100 and is stored in a register of the memory 152. Specific examples of the luminance setting data D1 are described below.

The luminance of each light-emitting region 110*s* of the planar light source 111 is affected not only by the light emitted from one light source 114 belonging to one light-emitting region 110*s* itself, but also the light propagating from neighboring light-emitting regions 110*s* at the periphery. In the example shown in FIG. 3, light emitted from one light-emitting region 110*s* that enters the adjacent light-emitting regions 110*s* passes mainly between the light-reflective sheet 112*s* and the light-reflecting member 117.

The effects on one light-emitting region 110*s* from its neighboring light-emitting regions 110*s* at the periphery are dependent on the position of the one light-emitting region 110*s*. For the light-emitting regions 110*s* sufficiently apart from the end portion of the planar light source 111, the effects from neighboring light-emitting regions 110*s* are large because the neighboring light-emitting regions 110*s* surround the entire periphery thereof. In contrast, for the light-emitting regions 110*s* positioned at the end portion of the planar light source 111, the effects from the neighboring light-emitting regions 110*s* are small because sides at which the neighboring light-emitting regions 110*s* are present are limited. According to the embodiment, the positional correction coefficients k are used to compensate such a difference of the effects from the neighboring light-emitting regions 110*s* that are dependent on the position of the light-emitting region 110*s*. The values of positional correction coefficient data k are set to be larger for the light-emitting regions 110*s* having less light entering from the neighboring light-emitting regions 110*s* at the periphery. Therefore, the values of the positional correction coefficients k of the light-emitting regions 110*s* positioned at the end portion of the planar light source 111 are greater than the values of the positional correction coefficients k of the light-emitting regions 110*s* apart from the end portion.

The value of the positional correction coefficient k has multiple levels according to the position of the light-emitting region 110*s*. According to the embodiment as shown in FIG. 7, the multiple levels of the positional correction coefficient k are, for example, the nine levels of the coefficients k_1 to k_5 and k_c1 to k_c4. The coefficient k_c1 is the coefficient set for the light-emitting region 110*s* located at the corner portion of the outermost perimeter of the planar light source 111. The coefficient k_1 is the coefficient set for the light-emitting regions 110*s* located at portions of the outermost perimeter of the planar light source 111 other than the corner portions (hereinbelow, called the "side portions"). The coefficient k_c2 is the coefficient set for the light-emitting region 110*s* located at the corner portion in the second column from the outermost perimeter of the planar light source 111. The coefficient k_2 is the coefficient set for the light-emitting regions 110*s* located at the side portions in the second column from the outermost perimeter of the planar light source 111. The coefficient k_c3 is the coefficient set for the light-emitting region 110*s* located at the corner portion in the third column from the outermost perimeter of the planar light source 111. The coefficient k_3 is the coefficient set for the light-emitting regions 110*s* located at the side portions in the third column from the outermost perimeter of the planar light source 111. The coefficient k_c4 is the coefficient set for the light-emitting region 110*s* located at the corner portion in the fourth column from the outermost perimeter of the planar light source 111. The coefficient k_4 is the coefficient set for the light-emitting regions 110*s* located at the side portions in the fourth column from the outermost perimeter of the planar light source 111. The coefficient k_5 is the coefficient set for the light-emitting regions 110*s* located in the fifth column from the outermost perimeter of the planar light source 111 and in columns further inward.

It is preferable for the positional correction coefficient to be larger for the light-emitting regions 110*s* proximate to the end portion of the planar light source 111. In other words, it is preferable for k_c1>k_c2>k_c3>k_c4 and k_1>k_2>k_3>k_4>k_5. However, when a small quantity of the light-emitting regions 110*s* are provided in the planar light source 111, the number of levels of the positional correction coefficient may be small. For example, k_1>k_2>k_3=k_4=k_5 may be set. Also, the number of levels of the positional correction coefficient may be increased when a large quantity of the light-emitting regions 110*s* are provided in the planar light source 111.

In each column, the positional correction coefficient of the light-emitting region 110*s* positioned at the corner portion may be greater than the positional correction coefficients of the light-emitting regions 110*s* positioned at the side portions. In other words, k_c1>k_1, k_c2>k_2, k_c3>k_3, and k_c4>k_4 may be set. However, in each column, the positional correction coefficient of the light-emitting region 110*s* positioned at the corner portion may be equal to the positional correction coefficients of the light-emitting regions 110*s* positioned at the side portions. In other words, k_c1=k_1, k_c2=k_2, k_c3=k_3, and k_c4=k_4 may be set. The positional correction coefficient k can be appropriately set according to the characteristics of the backlight 110.

As shown in FIG. 6, based on the luminance setting data D1, the luminance profile Pr, and the data of the positional correction coefficients k of one light-emitting region 110*s*, the luminance estimation data generator 153*b* generates luminance estimation data D2, which indicates the estimated value of the actual luminance of each light-emitting region 110*s*. The luminance profile Pr indicates the effects of the luminance of one light-emitting region 110*s* among the multiple light-emitting regions 110*s* on the luminances of the other light-emitting regions 110*s* among the multiple light-emitting regions 110*s*. The luminance profile Pr is set in the design stage of the image display device 100 and is stored in the flash memory of the memory 152 as, for example, a function, a group of numerical values, or a filter. Specific examples of the luminance profile Pr and the luminance estimation data D2 are described below.

In FIG. 8, "ON" indicates the light-emitting region 110*s* that is lit, and "OFF" indicates the light-emitting regions 110*s* that are unlit. As shown in FIG. 8, the luminance profile Pr indicates how the luminance of one light-emitting region 110*s* among the multiple light-emitting regions 110*s* included in the planar light source 111 effects on the luminances of the other light-emitting regions 110*s* when only the one light-emitting region 110*s* is lit and the other light-emitting regions 110*s* are unlit. The luminance profile Pr is highest in the lit light-emitting region 110*s* and decreases as the unlit light-emitting regions 110*s* departs from the lit light-emitting region 110*s*. Although FIG. 8 shows an example in which the luminance profile Pr is a smooth curve, the luminance profile Pr may be irregular at the boundary between the adjacent light-emitting regions 110*s*.

As shown in FIG. 6, the gradation setting data generator 153*c* generates gradation setting data D3 of the gradation values of the pixels 130*p* based on the image data IMD and the luminance estimation data D2. Specific examples of the gradation setting data D3 are described below.

The control unit 153*d* causes the display panel 130 to display the image IM by controlling the planar light source 111 based on the luminance setting data D1 and by controlling the display panel 130 based on the gradation setting data D3.

The output interface 154 is connected to the backlight driver 120. Also, the output interface 154 includes, for example, a connection terminal of the display panel driver 140 such as a HDMI (registered trademark) terminal, etc., and is connected to the display panel driver 140. The backlight driver 120 receives the backlight control data SG1 via the output interface 154. The method for controlling the backlight is, for example, time-shared control. However, the control method is not limited thereto, and the magnitude of the current supplied to the light source 114 may be controlled. The liquid crystal driver 140 receives the display panel control data SG2 via the output interface 154.

Image Display Method

An operation of the image display device 100 according to the embodiment, i.e., an image display method according to the embodiment, will now be described.

Figure 9:
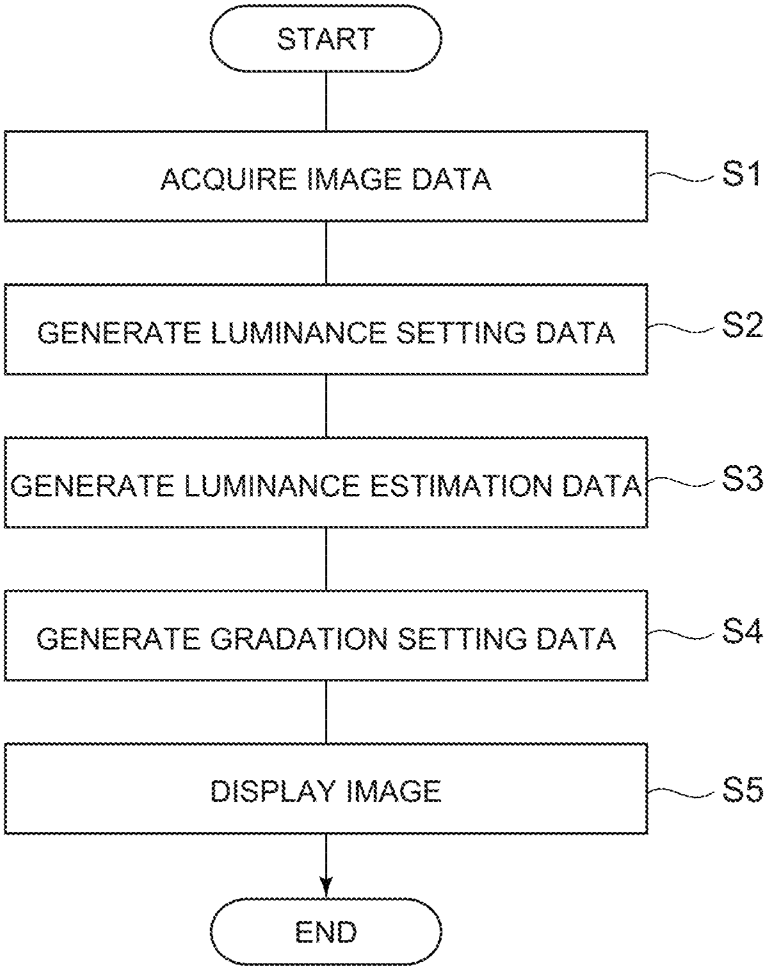
FIG. 9 is a flowchart of an image display method according to the embodiment.

FIG. 9 is a flowchart showing the image display method according to the embodiment.

The luminance profile Pr and the data of positional correction coefficients k are prestored in the memory 152.

As shown in FIG. 9, the image display method according to the embodiment includes a process S1 of receiving the image data IMD, a process S2 of generating the luminance setting data D1, a process S3 of generating the luminance estimation data D2, a process S4 of generating the gradation setting data D3, and a process S5 of displaying the image IM in the display panel 130.

The processes will now be elaborated. A method of displaying one image IM in the display panel 130 will now be described. Sets of the image data IMD are sequentially input to the image display device 100. For example, when the image display device 100 displays a video image at a frame rate of 60 fps, sixty sets of the image data IMD are sequentially input to the image display device 100 each second, and sixty images IM per second are displayed by the controller 150 performing the processes S1 to S5 sixty times per second for the image data IMD. As a result, the viewer can perceive the continuously-displayed multiple images IM as a video image.

Process S1 of Receiving Image Data IMD

As shown in the process S1 of FIGS. 5, 6, and 9, the input interface 151 of the controller 150 receives the image data IMD from the external device 900. The received image data IMD is stored in the memory 152.

Figure 10:
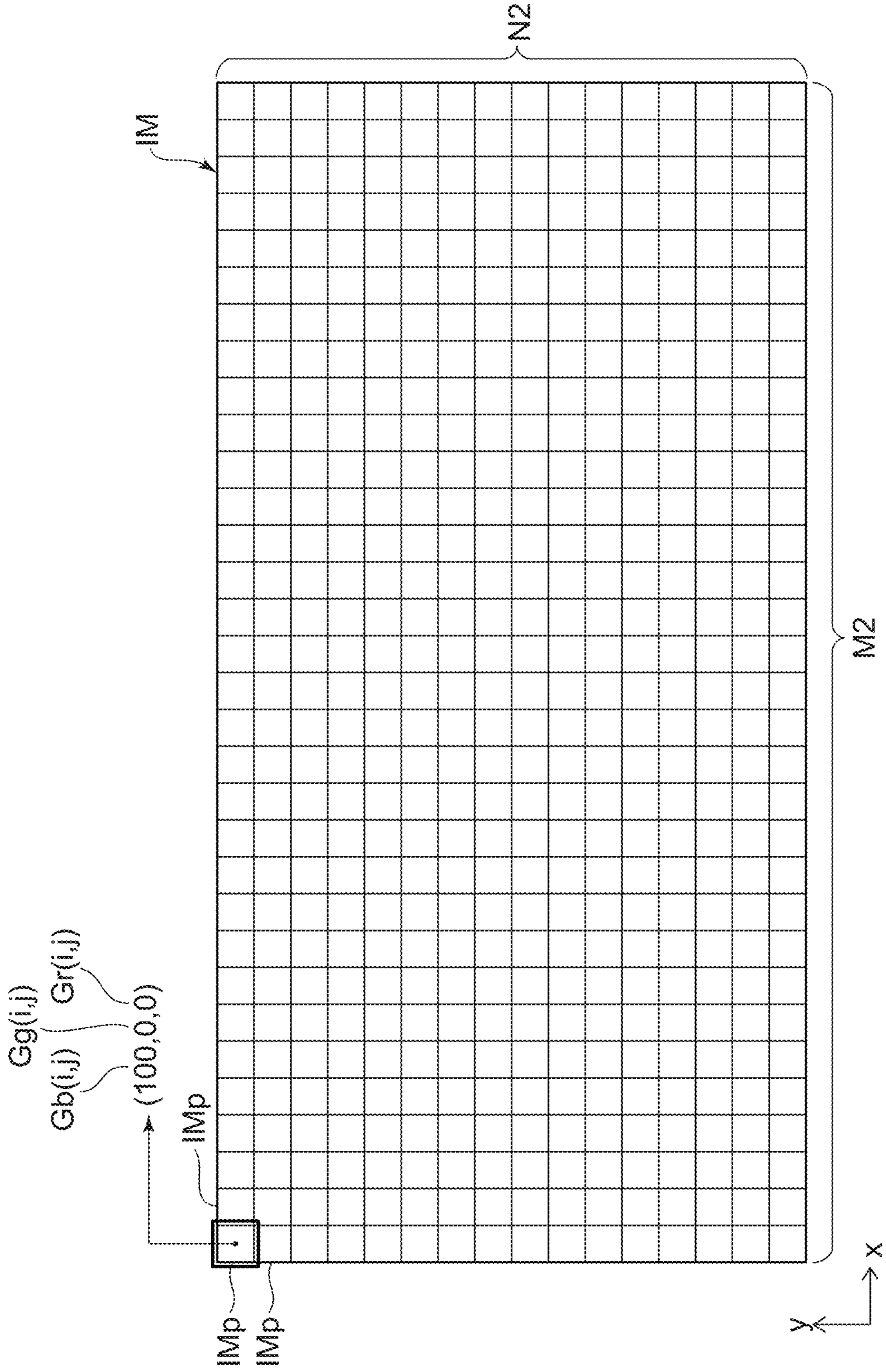
FIG. 10 shows image data input to the controller in the image display method according to the embodiment.

FIG. 10 shows the image data input to the controller in the image display method according to the embodiment.

Figure 11:
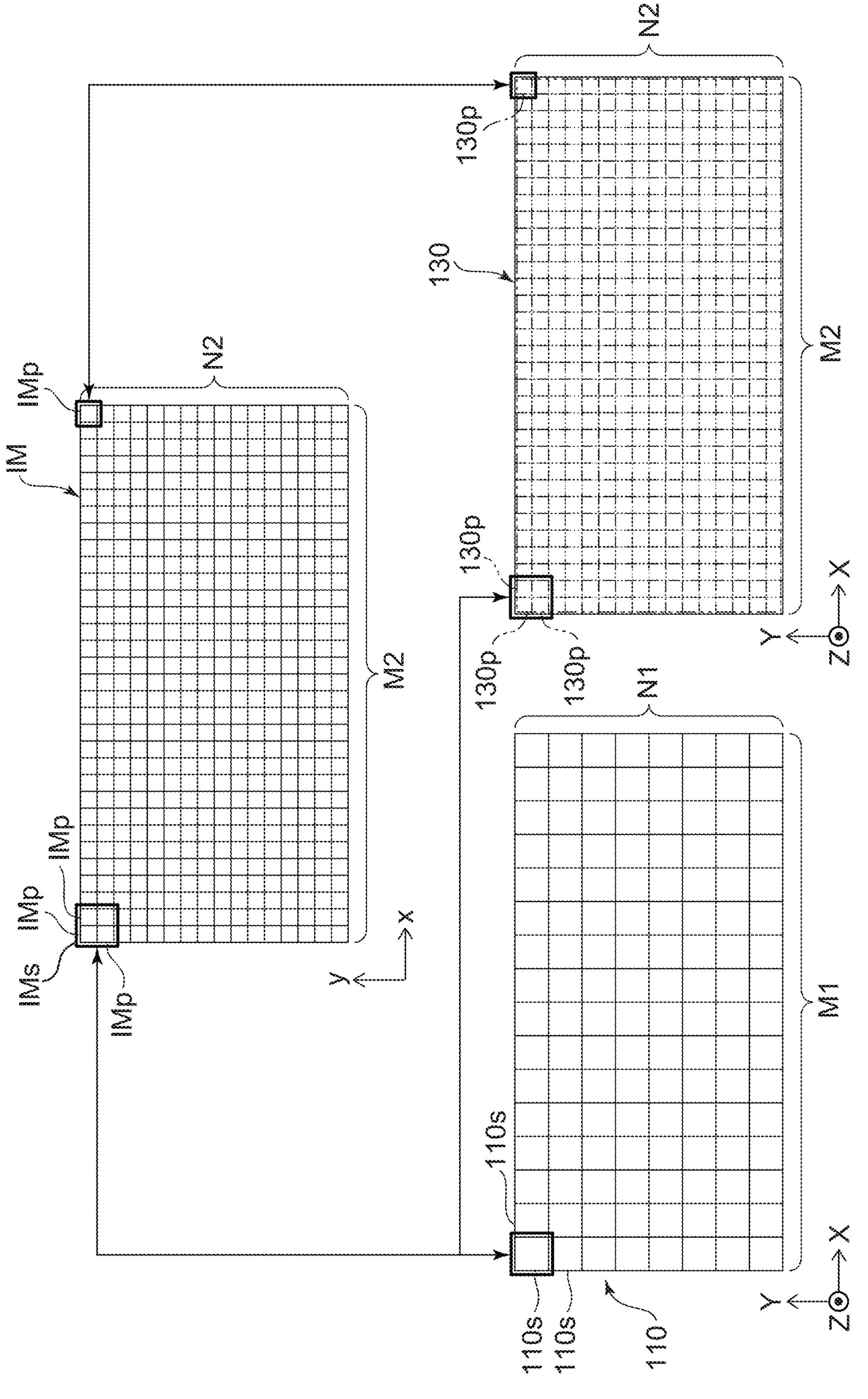
FIG. 11 shows a relationship of pixels of the image data input to the controller, the light-emitting regions of the backlight, and the pixels of the display panel in the image display method according to the embodiment.

FIG. 11 shows the relationship of the pixels of the image data input to the controller, the light-emitting regions of the backlight, and the pixels of the display panel in the image display method according to the embodiment.

As shown in FIG. 10, data of the image IM that is input includes data of multiple pixels Imp arranged in a matrix configuration. To simplify the description, an example is described in which one pixel Imp of the image IM corresponds to one pixel 130*p* of the display panel 130 as shown in FIG. 11. In other words, the multiple pixels Imp according to the embodiment are arranged in N2 rows and M2 columns. In the image IM, an image area Ims that corresponds to one light-emitting region 110*s* of the backlight 110 includes multiple pixels Imp. However, the correspondence between the pixels Imp of the image IM and the pixels 130*p* of the display panel 130 may not be one-to-one. In such a case, the processor 153 of the controller 150 performs the following processing after performing preprocessing of the image data IMD so that the pixels Imp of the image IM and the pixels 130*p* of the display panel 130 correspond one-to-one.

Gradations are set for the pixels Imp. According to the embodiment, the image IM is a color image. Therefore, as shown in FIG. 10, a blue gradation Gb(i, j), a green gradation Gg(i, j), and a red gradation Gr(i, j) are set for the pixel Imp positioned at the ith row and the jth column. Here, i is any integer from 1 to N2, and j is any integer from 1 to M2. The gradations Gb(i, j), Gg(i, j), and Gr(i, j) are, for example, numerals from 0 to 255 when represented by 8 bits. The brightness increases as the numeral of the gradation increases. The gradation "0" indicates an unlit state, and the gradation "255" indicates a fully lit state. When the display panel 130 displays the image IM and the display panel 130 is a liquid crystal panel, the transmittance of the liquid crystal for the light is a minimum for the gradation "0", and the transmittance of the liquid crystal for the light is a maximum for the gradation "255".

Process S2 of Generating Luminance Setting Data D1

Figure 12:
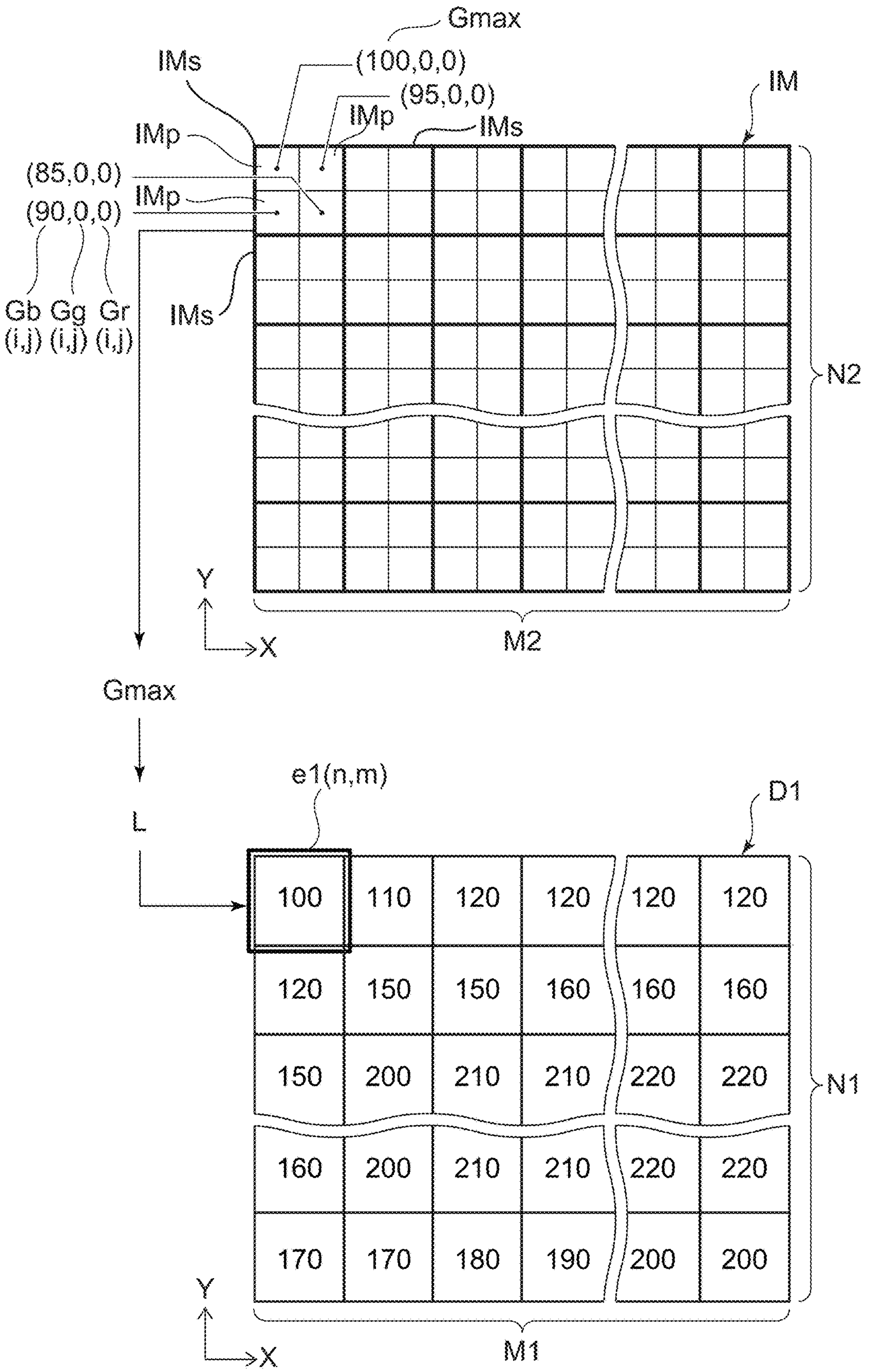
FIG. 12 illustrates a schematic view of the backlight to explain a method for generating luminance setting data in the image display method according to the embodiment.

FIG. 12 is a schematic view of the backlight to explain a method for generating the luminance setting data D1 in the image display method according to the embodiment.

As shown in FIG. 12 and in the process S2 of FIGS. 6 and 9, the luminance setting data generator 153*a* reads the image data IMD and the data of the positional correction coefficients k from the memory 152 and generates the luminance setting data D1, which indicates the setting value of the luminance of each light-emitting region 110*s*, based on the image data IMD and the data of the positional correction coefficients k. As described above, the data of the positional correction coefficients k is a group of numerical values that are set for the light-emitting regions 110*s* and is associated with the positions of the light-emitting regions 110*s* in the planar light source 111.

A specific example of the method for generating the luminance setting data D1 will now be described.

The luminance setting data generator 153*a* determines one image area Ims that corresponds to the light-emitting region 110*s* positioned at the nth row and the mth column. Because one image area Ims corresponds to one light-emitting region 110*s*, the multiple image areas Ims are arranged in N1 rows and M1 columns in the image IM. Accordingly, n is any integer between 1 and N1, and m is any integer between 1 and M1.

Then, the luminance setting data generator 153*a* uses the maximum value of the blue gradation Gb(i, j), the green gradation Gg(i, j), and the red gradation Gr(i, j) among all of the pixels Imp included in the image area Ims as a maximum gradation Gmax of the image area Ims. In the example shown in FIG. 12, the gradation (Gb(i, j), Gg(i, j), and Gr(i, j)) of four pixels Imp included in the image area Ims is (100, 0, 0), (95, 0, 0), (90, 0, 0), and (85, 0, 0). In such a case, the maximum gradation Gmax is 100.

Then, the luminance setting data generator 153*a* calculates a luminance L by multiplying the maximum gradation Gmax by the positional correction coefficient k. In other words, the luminance L is a luminance sufficient to display the maximum gradation Gmax, and compensates for the difference of the effects from the light-emitting regions 110*s* at the periphery that are dependent on the position of the light-emitting region 110*s*. The luminance L increases as the maximum gradation Gmax of the light-emitting region 110*s* increases. Even for the same maximum gradation Gmax, the luminances L of the light-emitting regions 110*s* positioned at the end portion of the planar light source 111 are set to be greater than the luminances L of the light-emitting regions 110*s* away from the end portion.

Then, the luminance setting data generator 153*a* uses the luminance L as the value of an element e1(*n, m*) positioned at the nth row and the mth column of the luminance setting data D1. The luminance setting data generator 153*a* performs this processing for all of the image areas Ims. The luminance setting data D1 is generated thereby.

The luminance setting data D1 thus obtained is matrix data of N1 rows and M1 columns. The value of the element e1(*n, m*) of the luminance setting data D1 positioned at the nth row and the mth column is the setting value of the luminance of the light-emitting region 110*s* positioned at the nth row and the mth column. For example, the element e1(*n, m*) is the value of the numerical value of the maximum gradation Gmax of the image area Ims positioned at the nth row and the mth column multiplied by the corresponding positional correction coefficient k and converted into the luminance L. In the example shown in FIG. 12, the value of the positional correction coefficient k is 1. The luminance setting data generator 153*a* stores the luminance setting data D1 in the memory 152.

Process S3 of Generating Luminance Estimation Data D2

Figure 13:
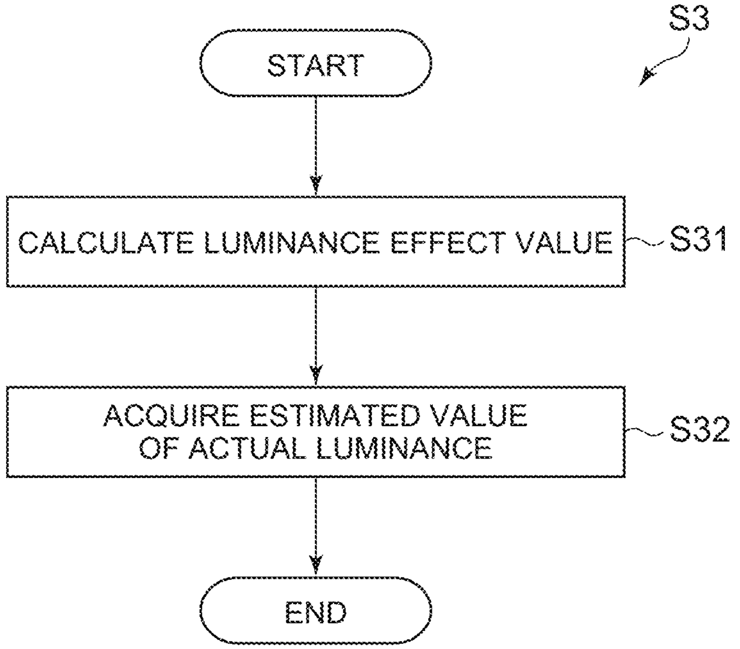
FIG. 13 is a flowchart of a method for generating luminance estimation data in the image display method according to the embodiment.

FIG. 13 is a flowchart of a method for generating the luminance estimation data D2 in the image display method according to the embodiment.

Figure 14:
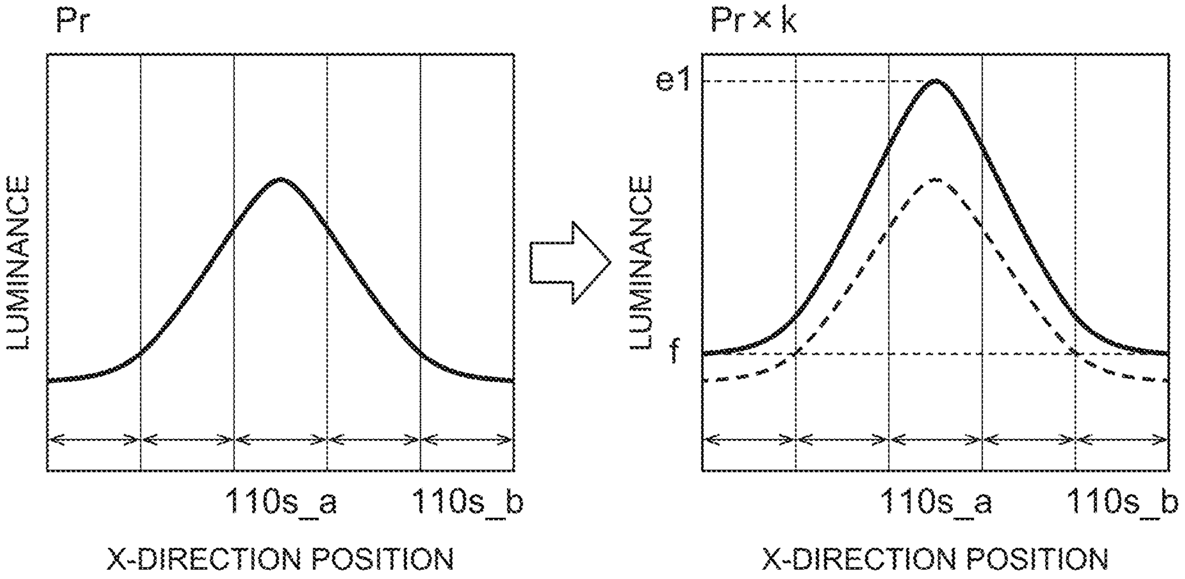
FIG. 14 shows luminance profiles to explain a method for calculating a luminance effect value in the image display method according to the embodiment.

FIG. 14 shows luminance profiles to explain a method for calculating a luminance effect value f in the image display method according to the embodiment.

Figure 15:
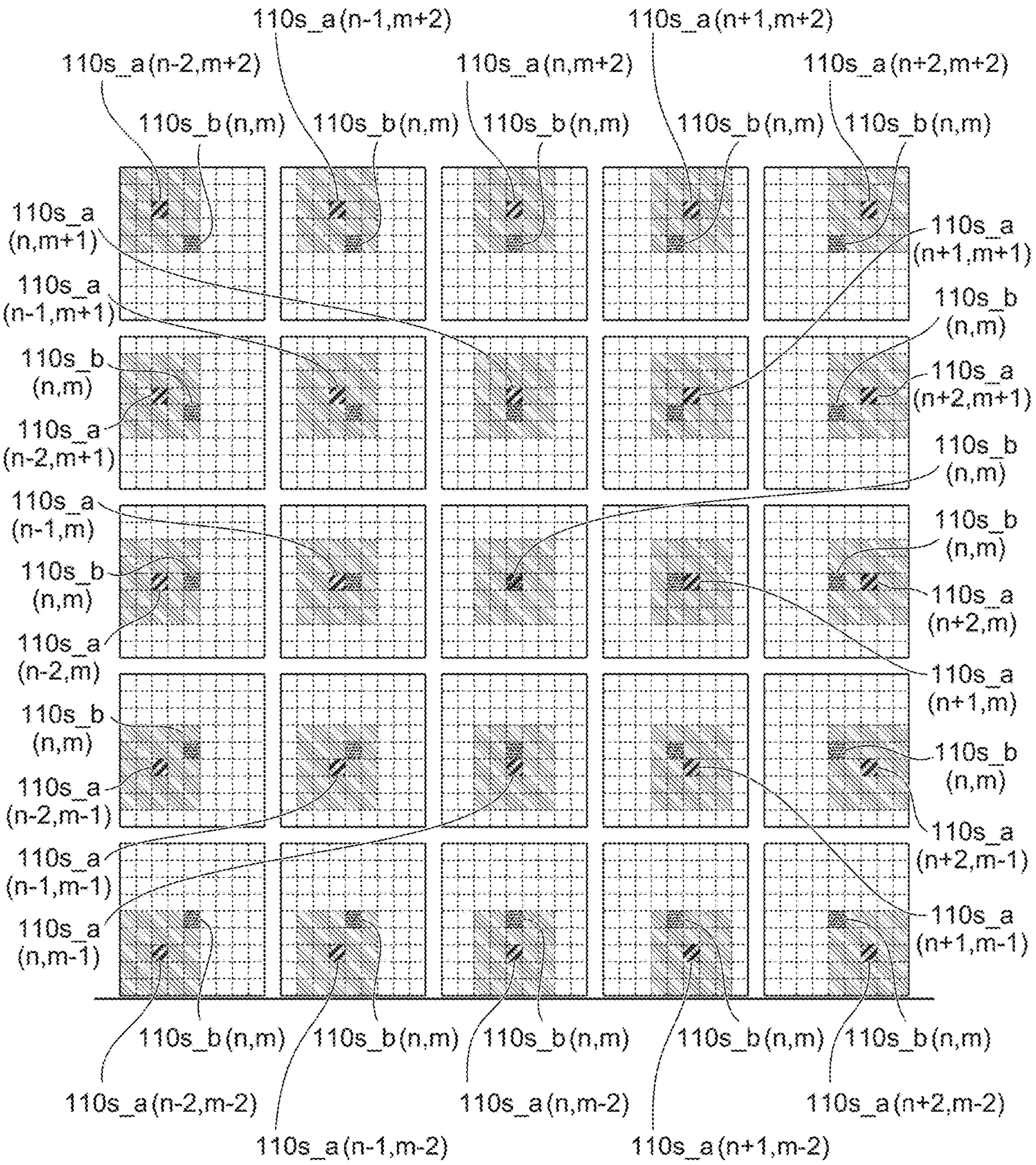
FIG. 15 shows examples of group light emitting regions to explain a method for generating luminance estimation data in the image display method according to the embodiment.

FIG. 15 shows examples of group light emitting regions to explain a method for generating the luminance estimation data D2 in the image display method according to the embodiment.

As shown in the process S3 of FIGS. 6 and 9, the luminance estimation data generator 153*b* generates the luminance estimation data D2, which indicates the estimated value of the actual luminance of each light-emitting region 110*s*, based on the luminance setting data D1, the luminance profile Pr that indicates the effects of the luminance of one light-emitting region 110*s* among the multiple light-emitting regions 110*s* (hereinbelow, called the "one light-emitting region 110*s_a*") on the luminance of another light-emitting region 110*s* (hereinbelow, called the "another light-emitting region 110*s_b*"), and the data of the positional correction coefficients k of the light-emitting regions 110.

More specifically, as shown in FIG. 13, the process S3 of generating the luminance estimation data D2 includes a process S31 of calculating the luminance effect value f, and a process S32 of acquiring the estimated value of the actual luminance of the light-emitting region.

As shown in FIGS. 13 and 14, in the process S31 of calculating the luminance effect value f, the luminance estimation data generator 153*b* reads the luminance profile Pr, the data of the positional correction coefficients k, and the luminance setting data D1 from the memory 152. The luminance setting data D1 is the group of the elements e1(*n, m*). Then, the luminance estimation data generator 153*b* calculates the luminance effect value f to be the value at the position of the other light-emitting region 110*s_b* referenced to the setting value e1 of the luminance of the one light-emitting region 110*s_a* in the profile (Pr×k) of the luminance profile Pr multiplied by the positional correction coefficient k of the one light-emitting region 110*s_a*.

As shown in FIGS. 13 and 15, in the process S32 of acquiring the estimated value of the luminance, the luminance estimation data generator 153*b* calculates the sum of the setting value e1 of the luminance of the other light-emitting region 110*s_b* and the luminance effect values f of multiple one light-emitting regions 110*s_a*, and uses the sum as an estimated value e2 of the actual luminance of the other light-emitting region 110*s_b*.

FIG. 15 shows the effects of the one light-emitting region 110*s_a* on the other light-emitting region 110*s_b*. According to the embodiment, for example, as shown in FIG. 11, the backlight 110 includes 128 light-emitting regions 110*s*. FIG. 15 shows twenty-five examples of the effects of one of the 128 light-emitting regions 110*s* on twenty-five light-emitting regions 110*s* including the light-emitting region 110*s* itself at center (i.e., 5×5 light-emitting regions). In other words, one "other light-emitting region 110*s_b*" is affected by the twenty-four "one light-emitting regions 110*s_a*" at the periphery and the "other light-emitting region 110_*b*" itself. In FIG. 15, the range of the effects of the one light-emitting region 110*s_a* is illustrated by hatching.

In the example shown in FIG. 15, for one "other light-emitting region 110*s_b*", the luminance effect values f of twenty-four "one light-emitting regions 110*s_a*" and their sum total are calculated. The twenty-four "one light-emitting regions 110*s_a*" include eight first light-emitting regions 110*s_a* adjacent to the other light-emitting region 110*s_b* (i.e., 3×3 light-emitting regions except its center) and sixteen second light-emitting regions 110*s_a* adjacent to the eight first light-emitting regions 110*s*. "Adjacent" also includes diagonal positions. The first light-emitting regions 110*s_a* are light-emitting regions that are one-adjacent to the other light-emitting region 110*s_b*, and the second light-emitting regions 110*s_a* are light-emitting regions that are two-adjacent to the other light-emitting region 110*s_b*.

More specifically, when the coordinates of the other light-emitting region 110*s_b* are (n, m), the coordinates of the eight first light-emitting regions 110*s_a* are (n−1, m+1), (n, m+1), (n+1, m+1), (n−1, m), (n+1, m), (n−1, m−1), (n, m−1), and (n+1, m+1). Also, the coordinates of the sixteen second light-emitting regions 110*s_a* are (n−2, m+2), (n−1, m+2), (n, m+2), (n+1, m+2), (n+2, m+2), (n−2, m+1), (n+2, m+1), (n−2, m), (n+2, m), (n−2, m−1), (n+2, m−1), (n−2, m−2), (n−1, m−2), (n, m−2), (n+1, m−2), and (n+2, m−2). The luminance estimation value e2(*n, m*) of the other light-emitting region 110*s_b* is set to be the luminance setting value e1(*n, m*) of the other light-emitting region 110*s_b* itself added to the sum total of the luminance effect values f corresponding to the twenty-four "one light-emitting regions 110*s_a*". The luminance estimation value e2(*n, m*) can be represented by the following Formula 1, wherein "f(h, i)" is the luminance effect value f of the light-emitting region 110*s* at the coordinates (h, i). When the one light-emitting region 110*s_a* and the other light-emitting region 110*s_b* match, f(n, m) is set to 0.

$$e2(n, m) = \sum_{h=n-2}^{n+2} \sum_{i=m-2}^{m+2} f(h, i) + e1(n, m) \qquad \text{[Formula 1]}$$

When the luminance profile Pr is steep enough that it is practically sufficient to consider the light-emitting regions 110*s* up to the one-adjacent light-emitting regions 110*s*, setting of the luminance estimation value may use only the eight first light-emitting regions 110*s_a*. On the other hand, when the luminance profile Pr is broad enough that it is insufficient to consider the light-emitting regions 110*s* up to the two-adjacent light-emitting regions 110*s*, setting of the luminance estimation value may use a third light-emitting region 110*s_a* that is adjacent to the second light-emitting region 110*s_a*, i.e., a light-emitting region 110*s_a* that is three-adjacent to the other light-emitting region 110*s_b*, may be considered in addition to the first and second light-emitting regions, and a fourth light-emitting region 110*s_a* that is adjacent to the third light-emitting region, i.e., a light-emitting region 110*s_a* that is four-adjacent to the other light-emitting region 110*s_b*. For example, the luminance profile Pr is expressed as "steep" when the full width at half maximum of the luminance profile Pr is not more than the width of the light-emitting region 110*s*, and the luminance profile Pr is expressed as "broad" when the full width at half maximum of the luminance profile Pr is not less than 4 times the width of the light-emitting region 110*s*. Also, all of the light-emitting regions 110*s* located in the planar light source 111 may be considered. Although the accuracy of the luminance estimation data D2 increases as the number of the light-emitting regions 110*s* considered increases, the calculation load to calculate the luminance estimation data D2 increases.

The luminance estimation data D2 is then generated by calculating the luminance estimation value e2(*n, m*) for all of the light-emitting regions 110*s*. The luminance estimation data D2 is matrix data of (N1×M1) luminance estimation values e2(*n, m*) arranged in N1 rows and M1 columns. The luminance estimation data generator 153*b* stores the luminance estimation data D2 in the memory 152.

Process S4 of Generating the Gradation Setting Data D3.

Figure 16:
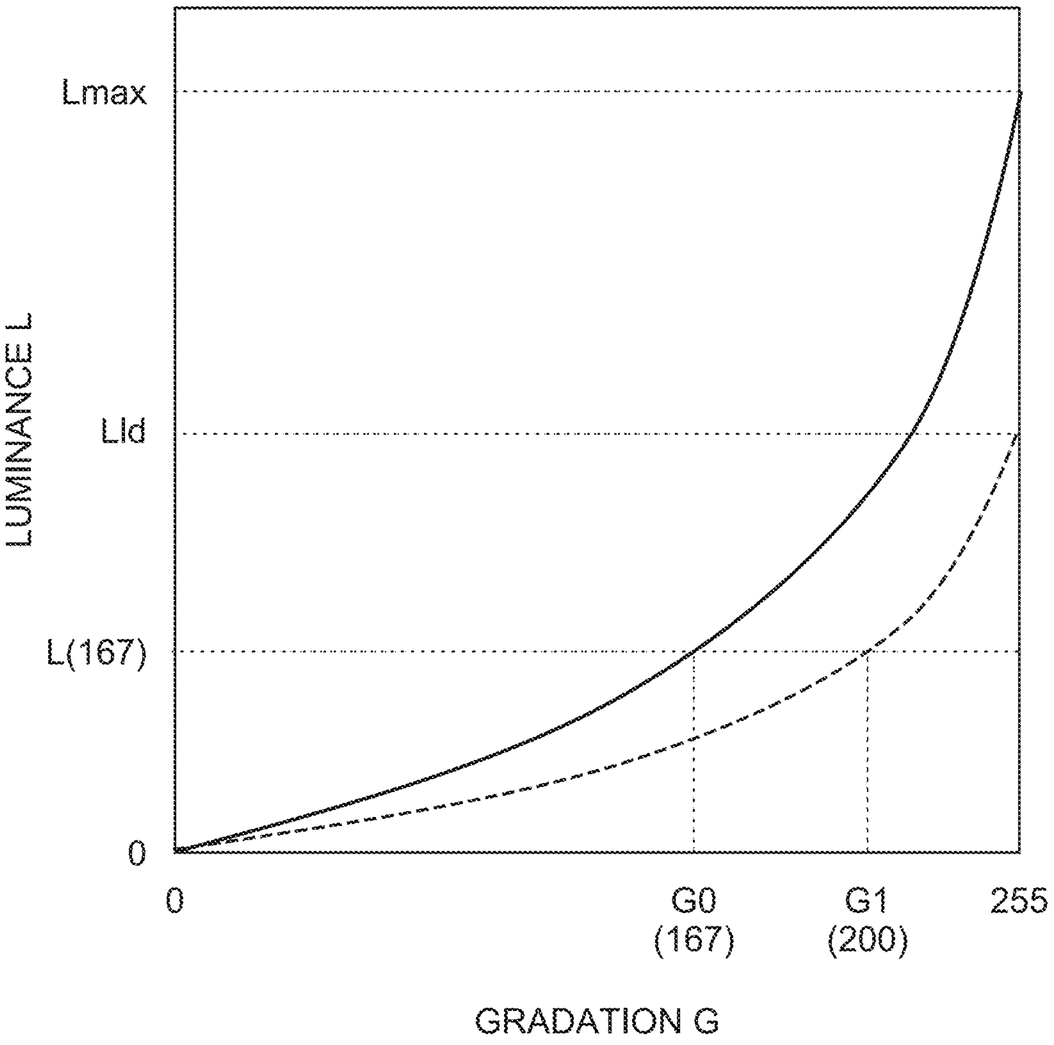
FIG. 16 is a graph showing a relationship between the gradation of pixels of the display panel and the luminance of pixels of the backlight according to the embodiment.

FIG. 16 is a graph showing the relationship between the gradation of pixels of the display panel and the luminance of pixels of the backlight according to the embodiment, in which the lateral axis is the gradation, and the vertical axis is the luminance.

In FIG. 16, the case where local dimming is not performed is illustrated by a solid line, and the case where the local dimming is performed is illustrated by a broken line.

As shown in FIGS. 9 and 16, the gradation setting data generator 153*c* reads the image data IMD and the luminance estimation data D2 from the memory 152. Then, the gradation setting data generator 153*c* generates the gradation setting data D3 of the gradation values of the pixels 130*p* based on the image data IMD and the luminance estimation data D2. The gradation setting data generator 153*c* stores the gradation setting data D3 in the memory 152.

When the local dimming is not performed, the relationship between the gradation and the luminance can be represented by the following Formula 2. In the following Formula 2, G is the gradation, L(G) is the luminance when the gradation is G, Gmax is the maximum value of the gradation, Lmax is the maximum value of the luminance, and γ is the gamma value. According to the embodiment, the minimum value of the gradation G is 0, and the maximum value (Gmax) is 255. The gamma value γ is, for example, 2.2.

$$L(G) = L\max \times \left(\frac{G}{G\max}\right)^{\gamma} \qquad \text{[Formula 2]}$$

When the local dimming is performed, in the dark regions of the image IM, the luminance of the light-emitting region 110*s* is reduced, and the gradation of the pixel 130*p* is increased commensurately. The graphic representation of dark regions in the image IM can be more precise thereby. The control of the luminances of the light-emitting regions 110*s* is performed based on the luminance setting data D1 described above. On the other hand, the adjustment of the gradations of the pixels 130*p* is performed as follows based on the image data IMD and the luminance estimation data D2.

When the local dimming is not performed, the conversion formula of the original gradation G0 and the gradation G1 after adjusting is represented by the following Formula 3, wherein G0 is the original gradation, and G1 is the gradation after adjusting when the local dimming is performed. In the following Formula 3, Lld is the maximum value of the luminance when the local dimming is performed. The maximum value Lld of the luminance is determined based on the luminance estimation data D2. For example, the maximum value Lld of the luminance of the light-emitting region 110*s* at the coordinates (n, m) is the luminance estimation value e2(*n, m*).

$$G1 = G0 \times \frac{1}{\left(\frac{Lld}{L\max}\right)^{\frac{1}{\gamma}}} \qquad \text{[Formula 3]}$$

In an example, when the maximum value Lld of the luminance by the local dimming is set to (⅔) times the maximum value Lmax of the luminance when the local dimming is not performed, the gradation G1 after adjusting is 200 for an original gradation G0 of 167.

Process S5 of Displaying the Image IM in the Display Panel 130

As shown in the process S5 of FIGS. 6 and 9, the control unit 153*d* controls the planar light source 111 based on the luminance setting data D1 and controls the display panel 130 based on the gradation setting data D3. The display panel 130 displays the image IM accordingly.

Specifically, as shown in FIG. 6, the control unit 153*d* reads the luminance setting data D1 and the gradation setting data D3 from the memory 152. Then, the control unit 153*d* generates the backlight control data SG1 based on the luminance setting data D1 and outputs the backlight control data SG1 to the backlight driver 120 via the output interface 154. The backlight control data SG1 is, for example, data of a PWM (Pulse Width Modulation) format, but is not particularly limited as long as the data can be used to control the driving of the backlight driver 120. The control unit 153*d* generates the display panel control data SG2 based on the gradation setting data D3 and outputs the display panel control data SG2 to the display panel driver 140 via the output interface 154.

In the above-described manner, the backlight driver 120 controls the outputs of the light sources 114 based on the backlight control data SG1. Based on the display panel control data SG2, the display panel driver 140 controls the pixels 130*p*, and more specifically, the light transmittances of the subpixels 130*sp*. As a result, the display panel 130 displays the image IM.

The timing of converting the luminance setting data D1 into the backlight control data SG1 is not particularly limited as long as the conversion is in or after the process S2. When the gradation setting data D3 is converted into the display panel control data SG2, the timing of the conversion is not particularly limited as long as the timing is in or after the process S5.

Effects

According to the embodiment, the data of the positional correction coefficients k is used when generating the luminance setting data D1. As a result, the non-uniformity of the luminance by the positions of the light-emitting regions 110*s* in the planar light source 111 can be compensated, and the brightness of the image can be more uniform. By using the data of the positional correction coefficients k, the luminance of the light-emitting region 110*s* located at the end portion of the planar light source 111 can be the same or similar to the luminance of the light-emitting region 110*s* away from the end portion of the planar light source 111.

According to the embodiment, the luminance profile Pr and the data of the positional correction coefficients k are used when generating the luminance estimation data D2, which indicates the estimated values of the actual luminances of the light-emitting regions 110*s*. More specifically, when calculating the luminance estimation value e2 of one light-emitting region 110*s_b*, the luminance effect value f is calculated using the profile (Pr×k) of the luminance profile Pr multiplied by the positional correction coefficient k, the sum total of the luminance effect values f of the light-emitting regions 110*s_a* at the periphery is calculated, and the sum of this sum total and the luminance setting value e1 of the light-emitting region 110*s_b* itself is used as the luminance estimation value e2. The accuracy of the luminance estimation data D2 can be increased thereby. Then, the gradation setting data D3 is generated based on the luminance estimation data D2. The accuracy of the gradation setting data D3 also can be improved thereby. As a result, the brightness of the image IM can be more uniform.

If the luminance profile Pr is used instead of the profile (Pr×k) to calculate the luminance effect value f, the luminance effect value f of the light-emitting region 110*s* positioned at the end portion of the planar light source 111 would be calculated to be less than the actual value, and the luminance estimation value e2 would be undesirably estimated to be less than the actual value. As a result, as shown in FIG. 16 and Formula 3 above, the gradation G1 after adjusting may become too high, and the end portion of the image IM may undesirably appear brighter than the regions away from the end portion.

According to the embodiment, one type of the luminance profile Pr is stored in the memory 152, and the non-uniformity of luminance caused by the positions of the light-emitting regions 110*s* is compensated using the data of the positional correction coefficients k. This can suppress an increase of the capacity of the memory 152. Because the calculation of the luminance effect value f can be simplified, the controller 150 can be smaller and achieve faster processing.

Test Example

In the test example, the image display device according to the embodiment and an image display device according to a comparative example were made, and the uniformity of the brightness of each image was evaluated.

According to the embodiment as described above, the luminance setting data D1 was generated using the data of the positional correction coefficients k, and the luminance estimation data D2 was generated using the profile (Pr×k). In contrast, in the comparative example, the luminance setting data D1 was generated using the data of the positional correction coefficients k, but the luminance estimation data D2 was generated using the luminance profile Pr without using the data of the positional correction coefficients k.

The positional correction coefficient k was adjusted to make the brightness of the image uniform in the "full-white" state in which the gradations of all of the pixels 130*p* were set to 255. The total number of the light-emitting regions 110*s* was 1,000 in twenty-five rows and forty columns, of which the luminances of thirteen light-emitting regions 110*s* was measured, and the value of the ratio of the minimum value to the maximum value was used as an index of the uniformity. In other words, a uniformity U was defined by the following Formula 4, wherein Mmax is the maximum value of the measured luminances, and Mmin is the minimum value of the measured luminances. The uniformity U can be a value in a range of 0% to 100%; and the uniformity increases as the numerical value increases.

$$U = \frac{M\min}{M\max} \times 100(\%) \qquad \text{[Formula 4]}$$

Then, sets of the image data IMD representing images of uniform brightness for four levels of gradations (gradations of 31, 63, 127, and 255 (full-white)) were input to the image display device according to the embodiment and the image display device according to the comparative example, and the luminances of the images IM actually displayed were measured.

Figure 17A:
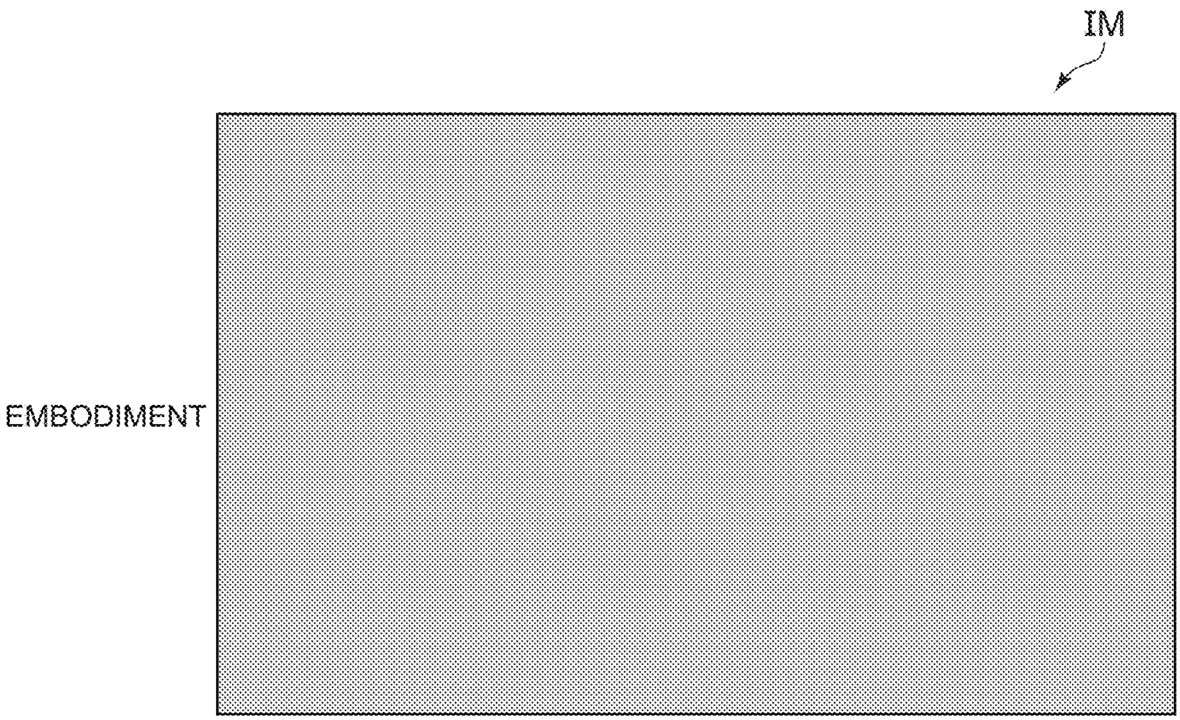
FIG. 17A schematically shows the image of the image display device according to the embodiment when the gradations of all of the pixels were set to 128.
Figure 17B:
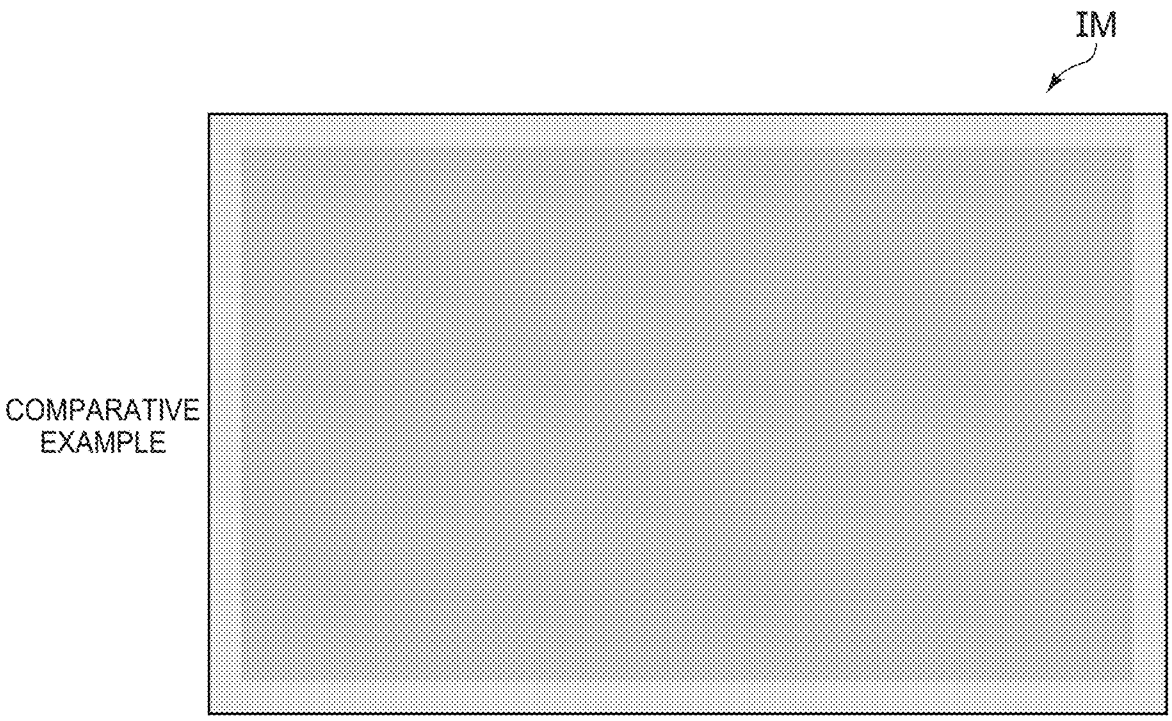
FIG. 17B schematically shows the image of the image display device according to a comparative example when the gradations of all of the pixels were set to 128.

FIG. 17A schematically shows the image IM of the image display device according to the embodiment when the gradations of all of the pixels were set to 128, and FIG. 17B schematically shows the image IM of the image display device according to the comparative example when the gradations of all of the pixels were set to 128.

FIGS. 17A and 17B are schematic views of photographs of the images.

Figure 18:
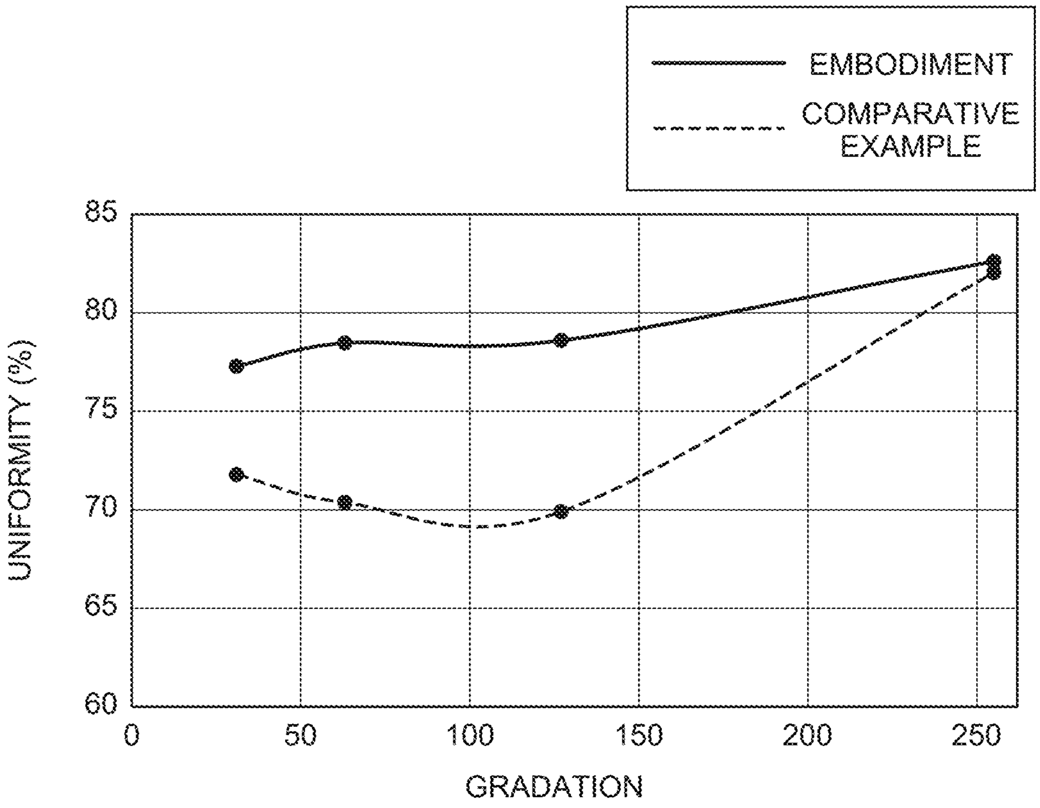
FIG. 18 is a graph showing comparison of luminance uniformity between the embodiment and the comparative example.

FIG. 18 is a graph showing the uniformities of the embodiment and the comparative example, in which the lateral axis is the gradation, and the vertical axis is the uniformity.

According to the embodiment as shown in FIG. 17A, the brightness of the image IM having the gradation of 128 was more uniform, but in the comparative example as shown in FIG. 17B, the end portion of the image IM having the gradation of 128 was brighter than the regions other than the end portion, and a boundary was visible.

As shown in FIG. 18, compared with the image display device according to the comparative example, the uniformity U was high in a wider gradation range in the image display device according to the embodiment.

The embodiments described above are examples embodying the invention, and the invention is not limited to these embodiments. For example, additions, deletions, or modifications of some of the components or processes in the embodiments described above also are included in the invention.

For example, the invention can be utilized in the display of a device such as a television, a personal computer, a game machine, etc.

Embodiments include the following aspects.

Aspect 1

An image display device, comprising:

a planar light source in which a plurality of light-emitting regions are set;

a display panel in which a plurality of pixels are set; and a controller controlling the planar light source and the display panel, the controller including, a luminance setting data generator generating luminance setting data that indicates setting values of luminances of the plurality of light-emitting regions based on, image data that is input, and position correction coefficients that are set for the plurality of light-emitting regions and associated with positions of the plurality of light-emitting regions in the planar light source, a luminance estimation data generator generating luminance estimation data that indicates an estimated value of an actual luminance of each of the plurality of light-emitting regions based on, the luminance setting data, a luminance profile indicating an effect of a luminance of one light-emitting region among the plurality of light-emitting regions on a luminance of another light-emitting region among the plurality of light-emitting regions, and the position correction coefficient of the one light-emitting region, a gradation setting data generator generating gradation setting data that indicates gradation values of the plurality of pixels based on the image data and the luminance estimation data, and a control unit causing the display panel that displays an image by, controlling the planar light source based on the luminance setting data, and controlling the display panel based on the gradation setting data.

Aspect 2

The device according to Aspect 1, wherein the controller further includes a memory storing the luminance setting data, the luminance profile, and the position correction coefficient.

Aspect 3

The device according to Aspect 1 or 2, wherein the controller further includes a memory storing the luminance setting data, the luminance profile, and the position correction coefficient.

Aspect 4

The device according to any one of Aspects 1 to 3, wherein the display panel is a liquid crystal panel.

Aspect 5

The device according to any one of Aspects 1 to 4, wherein the luminance estimation data generator:

calculates a luminance effect value in a profile of the luminance profile multiplied by the position correction coefficient of the one light-emitting region, the luminance effect value being a value at a position of the other light-emitting region referenced to a setting value of the luminance of the one light-emitting region;

calculates a sum of a setting value of the luminance of the other light-emitting region and the luminance effect values of a plurality of the one light-emitting regions, and uses the sum as an estimated value of an actual luminance of the other light-emitting region.

Aspect 6

The device according to Aspect 5, wherein the plurality of one light-emitting regions includes:

a plurality of first light-emitting regions adjacent to the other light-emitting region; and a plurality of second light-emitting regions adjacent to at least one of the plurality of first light-emitting regions.

Aspect 7

The device according to Aspect 6, wherein the plurality of one light-emitting regions further includes:

a third light-emitting region adjacent to at least one of the plurality of second light-emitting regions; and a fourth light-emitting region adjacent to the third light-emitting region.

Aspect 8

An image display method using a planar light source and a display panel, a plurality of light-emitting regions being set in the planar light source, a plurality of pixels being set in the display panel, the method comprising:

generating luminance setting data that indicates setting values of luminances of the plurality of light-emitting regions based on, image data that is input, and position correction coefficients that is set for the plurality of light-emitting regions and associated with positions of the plurality of light-emitting regions in the planar light source;

generating luminance estimation data that indicates an estimated value of an actual luminance of each of the plurality of light-emitting regions based on the luminance setting data, a luminance profile indicating an effect of a luminance of one light-emitting region among the plurality of light-emitting regions on a luminance of another light-emitting region among the plurality of light-emitting regions, and the position correction coefficient of the one light-emitting region;

generating gradation setting data that indicates gradation values of the plurality of pixels based on the image data and the luminance estimation data; and causing the display panel to display an image by controlling the planar light source based on the luminance setting data, and controlling the display panel based on the gradation setting data.

Aspect 9

The method according to Aspect 8, wherein the position correction coefficient of at least one of the plurality of light-emitting regions positioned at an end portion of the planar light source is greater than the position correction coefficient of at least one of the plurality of light-emitting regions away from the end portion.

Aspect 10

The method according to Aspect 8 or 9, wherein the generating of the luminance estimation data includes:

calculating a luminance effect value in a profile of the luminance profile multiplied by the position correction coefficient of the one light-emitting region, the luminance effect value being a value at a position of the other light-emitting region referenced to a setting value of the luminance of the one light-emitting region;

calculating a sum of a setting value of the luminance of the other light-emitting region and the luminance effect values of a plurality of the one light-emitting regions, and using the sum as an estimated value of an actual luminance of the other light-emitting region.

Aspect 11

The method according to Aspect 10, wherein the plurality of one light-emitting regions includes:

a plurality of first light-emitting regions adjacent to the other light-emitting region; and a plurality of second light-emitting regions adjacent to at least one of the plurality of first light-emitting regions.

Aspect 12

The method according to Aspect 11, wherein the plurality of one light-emitting regions further includes:

a third light-emitting region adjacent to at least one of the plurality of second light-emitting regions; and a fourth light-emitting region adjacent to the third light-emitting region.

What is claimed is:

1. An image display device comprising:

a backlight including a plurality of light-emitting regions arranged in one or more rows and one or more columns;

a display panel coupled to the backlight and including a plurality of pixels; and a controller configured to, with respect to input image data:

generate luminance setting data that sets a luminance value for each of the light-emitting regions of the backlight, based on:

the input image data; and data of positional correction coefficients, which is a matrix having one or more rows and one or more columns that correspond to those of the backlight, values of the matrix being fixed values that are preset with respect to the plurality of light-emitting regions, respectively, for compensating luminance non-uniformity over an entirety of the plurality of light-emitting regions;

generate luminance estimation data that indicates an estimated luminance value of the backlight operated in accordance with the luminance setting data with respect to each of the plurality of light-emitting regions, based on:

the luminance setting data, luminance profile data indicating a luminance distribution of light emitted by a single light-emitting region of the backlight onto the single light-emitting region and adjacent light-emitting regions thereof, and the data of positional correction coefficients;

generate gradation setting data that sets a gradation value for each of the pixels of the display panel, based on:

the input image data, and the luminance estimation data; and control the backlight to operate based on the luminance setting data and the display panel to operate based on the gradation setting data to display an image corresponding to the input image data, wherein in the data of positional correction coefficients, a first positional correction coefficient for a first light-emitting region is greater than a second positional correction coefficient for a second light-emitting region, the first light-emitting region being an outermost one of the plurality of light-emitting regions and the second light-emitting region being not an outermost one of the plurality of light-emitting regions.

2. The image display device according to claim 1, wherein, in generating the luminance setting data, the controller, with respect to each of the light-emitting regions of the backlight, multiples i) a maximum gradation value among gradation values of pixels of the input image data corresponding to the light-emitting region with ii) a corresponding one of the values of the matrix.

3. The image display device according to claim 1, wherein the first light-emitting region is at an outermost corner of the plurality of light-emitting regions and the second light-emitting region is at a corner inner than the first light-emitting region.

4. The image display device according to claim 1, wherein, in generating the luminance estimation data, the controller, with respect to each of the light-emitting regions of the backlight:

multiply i) the luminance distribution of the luminance profile data with ii) a corresponding one of the positional correction coefficients, to obtain a corrected luminance distribution of light emitted by the light-emitting region that is operated in accordance with the one of the luminance values of the luminance setting data corresponding to the light-emitting region;

calculate a sum of luminances of lights propagated from neighboring light-emitting regions that are operated in accordance with the corresponding ones of the luminance values of the luminance setting data, based on the corrected luminance distributions of the neighboring light-emitting regions; and calculate a sum of: i) the one of the luminance values of the luminance setting data corresponding to the light-emitting region; and ii) the sum of luminances of the lights propagated from the neighboring light-emitting regions.

5. The image display device according to claim 4, wherein the neighboring light-emitting regions are eight light-emitting regions, which are 3×3 regions except a center thereof.

6. The image display device according to claim 4, wherein the neighboring light-emitting regions are 24 light-emitting regions, which are 5×5 regions except a center thereof.

7. The image display device according to claim 1, further comprising:

a memory in which the data of positional correction coefficients and the luminance profile data are stored.

8. The image display device according to claim 1, wherein the display panel is a liquid crystal panel.

9. The image display device according to claim 1, wherein each of the plurality of light-emitting regions of the backlight corresponds to a plurality of pixels of the display panel.

10. An image display method using:

a backlight including a plurality of light-emitting regions arranged in one or more rows and one or more columns; and a display panel coupled to the backlight and including a plurality of pixels, the method comprising, with respect to input image data:

generating luminance setting data that sets a luminance value for each of the light-emitting regions of the backlight, based on:

the input image data; and data of positional correction coefficients, which is a matrix having one or more rows and one or more columns that correspond to those of the backlight, values of the matrix being fixed values that are preset with respect to the plurality of light-emitting regions, respectively, for compensating luminance non-uniformity over an entirety of the plurality of light-emitting regions;

generating luminance estimation data that indicates an estimated luminance value of the backlight operated in accordance with the luminance setting data, with respect to each of the plurality of light-emitting regions, based on:

the luminance setting data, luminance profile data indicating a luminance distribution of light emitted by a single light-emitting region of the backlight onto the single light-emitting region and adjacent light-emitting regions thereof, and the data of positional correction coefficients;

generating gradation setting data that sets a gradation value for each of the pixels of the display panel, based on:

the input image data, and the luminance estimation data; and controlling the backlight to operate based on the luminance setting data and the display panel to operate based on the gradation setting data to display an image corresponding to the input image data, wherein in the data of positional correction coefficients, a first positional correction coefficient for a first light-emitting region is greater than a second positional correction coefficient for a second light-emitting region, the first light-emitting region being an outermost one of the plurality of light-emitting regions and the second light-emitting region being not an outermost one of the plurality of light-emitting regions.

11. The image display method according to claim 10, wherein, said generating the luminance setting data comprises:

with respect to each of the light-emitting regions of the backlight, multiplying i) a maximum gradation value among gradation values of pixels of the input image data corresponding to the light-emitting region with ii) a corresponding one of the values of the matrix.

12. The image display method according to claim 10, wherein the first light-emitting region is at an outermost corner of the plurality of light-emitting regions and the second light-emitting region is at a corner inner than the first light-emitting region.

13. The image display method according to claim 10, wherein said generating the luminance estimation data comprises, with respect to each of the light-emitting regions of the backlight:

multiplying i) the luminance distribution of the luminance profile data with ii) a corresponding one of the positional correction coefficients, to obtain a corrected luminance distribution of light emitted by the light-emitting region that is operated in accordance with the one of the luminance values of the luminance setting data corresponding to the light-emitting region;

calculating a sum of luminances of lights propagated from neighboring light-emitting regions that are operated in accordance with the corresponding ones of the luminance values of the luminance setting data, based on the corrected luminance distributions of the neighboring light-emitting regions; and calculating a sum of: i) the one of the luminance values of the luminance setting data corresponding to the light-emitting region; and ii) the sum of luminances of the lights propagated from the neighboring light-emitting regions.

14. The image display method according to claim 13, wherein the neighboring light-emitting regions are eight light-emitting regions, which are 3×3 regions except a center thereof.

15. The image display method according to claim 13, wherein the neighboring light-emitting regions are 24 light-emitting regions, which are 5×5 regions except a center thereof.

16. The image display method according to claim 10, further comprising:

storing, in a memory, the data of positional correction coefficients and the luminance profile data.

17. The image display method according to claim 10, wherein the display panel is a liquid crystal panel.

18. The image display method according to claim 10, wherein each of the plurality of light-emitting regions of the backlight corresponds to a plurality of pixels of the display panel.

* * * * *